US011127079B2

(12) United States Patent
Brown

(10) Patent No.: US 11,127,079 B2
(45) Date of Patent: Sep. 21, 2021

(54) COMPUTER SIMULATED MONETARY ALLOCATION USING NETWORK OF OPERATOR DATA OBJECTS

(71) Applicant: Michael Arthur Brown, Washington, DC (US)

(72) Inventor: Michael Arthur Brown, Washington, DC (US)

( * ) Notice: Subject to any disclaimer, the term of this patent is extended or adjusted under 35 U.S.C. 154(b) by 0 days.

(21) Appl. No.: 16/505,272

(22) Filed: Jul. 8, 2019

(65) Prior Publication Data
US 2020/0013120 A1   Jan. 9, 2020

Related U.S. Application Data

(60) Provisional application No. 62/694,787, filed on Jul. 6, 2018.

(51) Int. Cl.
*G06Q 40/06* (2012.01)
*G06F 11/34* (2006.01)
*G06Q 40/08* (2012.01)

(52) U.S. Cl.
CPC ......... *G06Q 40/06* (2013.01); *G06F 11/3457* (2013.01); *G06Q 40/08* (2013.01)

(58) Field of Classification Search
CPC ..... G06Q 40/06; G06Q 40/08; G06F 11/3457
See application file for complete search history.

(56) References Cited

U.S. PATENT DOCUMENTS

| 6,041,312 A * | 3/2000 | Bickerton | G06Q 40/00 705/36 R |
| 8,655,875 B2 * | 2/2014 | Young | G06Q 40/02 707/736 |
| 9,378,526 B2 * | 6/2016 | Sampson | G06F 16/252 |
| 2002/0103631 A1 * | 8/2002 | Feldmann | H04L 45/12 703/22 |

(Continued)

FOREIGN PATENT DOCUMENTS

| EP | 2634745 A1 * | 9/2013 | ........... G06F 16/252 |
| WO | WO-2006072696 A1 * | 7/2006 | ....... G06Q 10/06315 |

OTHER PUBLICATIONS

Rawls, R. Stevens: Allocation of Damages for Ongoing Losses over Multiple Policies: Who Pays and How Much? Jan. 2006, pp. 1-9. (Year: 2006).*

(Continued)

*Primary Examiner* — Bijendra K Shrestha
(74) *Attorney, Agent, or Firm* — Staas & Halsey LLP

(57) ABSTRACT

An apparatus including a memory, and a processor coupled to the memory is provided to, obtain information indicating plural rules, a rule among the rules to specify a plurality of conditions including at least one monetary threshold condition and at least one corresponding condition for the monetary threshold condition; obtain information about a sequence of monetary amounts; and execute a process to transform the rules into operator data objects that define a logic common to the rules to control allocation of the sequence of monetary amounts to at least one category. The (Continued)

operator data objects form a network of operator data objects to simulate, according to the defined logic common to the rules, allocation of the sequence of monetary amounts in response to passing in sequence the information about the monetary amounts among the network of operator data objects.

12 Claims, 20 Drawing Sheets

(56) References Cited

U.S. PATENT DOCUMENTS

| | | | | |
|---|---|---|---|---|
| 2004/0088199 | A1* | 5/2004 | Childress | G06Q 40/02 |
| | | | | 705/4 |
| 2011/0040581 | A1* | 2/2011 | Wirth | G06Q 40/06 |
| | | | | 705/4 |
| 2016/0364802 | A1* | 12/2016 | Mendelsohn | G06Q 40/06 |
| 2018/0181911 | A1* | 6/2018 | Liu | G06Q 10/0834 |

OTHER PUBLICATIONS

Hardwick et al.: Using Path Induction to evaluate sequential allocation procedures, 1999, Society for Industrial and Applied Mathematics, vol. 21, No. 1, pp. 67-87 (Year: 1999).*

* cited by examiner

Operator Data Objects and Action Object

200 — Distributor:
- 201 — name: [unique identifier of each Core Operator instance]
- 202 — entrypoint: [Boolean flag; whether this Distributor serves as the Entrypoint Distributor]
- 203 — connections: [a set of references to other Distributor or Account objects]
- 204 — connectionvalues: [a set of values that correspond to the connections]
- 206 — refreshable: [Boolean flag; whether connectionvalues can be restored to original values]
- 208 — propagationpercent: [value stored during the Propagation Steps]

210 — Account:
- 211 — name: [unique identifier of each Core Operator instance]
- 212 — connections: [a set of references to Trigger objects]
- 214 — storedamount: [an amount accumulated during iterations within the Main Steps]
- 216 — refreshable: [Boolean flag; whether storedamount can be restored to original value]
- 218 — propagationpercent: [value stored during the Propagation Steps]

220 — Trigger:
- 221 — name: [unique identifier of each Core Operator instance]
- 222 — threshold: [a numeric value that serves as a threshold]
- 224 — actions: [a set of references to Action objects]
- 226 — fired: [Boolean flag; whether the actions have been executed]
- 228 — refreshable: [Boolean flag; whether the "fired" property can be reset to False]

230 — Action:
- 232 — type: [a designation of the type of the Action, such as "setconnection"]
- 234 — target1: [a reference to a Distributor]
- 236 — target2: [a reference to a Distributor or Account to which target1 connects]
- 238 — value: [for type "setconnection", the value to which a member of connectionvalues will be set]

FIG. 2A

2001
{
'type': 'distributor',         20011
'name': 'Distributor1',
'entrypoint': True,
'connections': [{insert name of target where $ should go after exhaustion},'Account Defense', 'Account Indemnity'],
'connectionvalues': [0.0, 0.33333333, 0.66666667],
'refreshable': False,
'entrypoint': False
}

2101
{
'type': 'account',
'name': 'Account Defense',
'storedamount': 0.0,
'connections': ['Aggregate Limit'],
'refreshable': False,
'keys': {'losstype': 'indemnity', 'storetype': 'allocation'},
}, 2102
{
'type': 'account',
'name': 'Account Indemnity',
'storedamount': 0.0,
'connections': ['Aggregate Limit'],
'refreshable': False,
'keys': {'losstype': 'defense', 'storetype': 'allocation'},
},

FIG. 2D

```
{
  'type': 'trigger',
  'name': 'Aggregate Limit',
  'threshold': 1000000.0,
  'actions': [['type': 'setconnection',         2201-0
               'target1': 'Distributor1',       2201-1
               'target2': 'Account Indemnity',  2201-2
               'value': 0.0],                   2201-3
              ['type': 'setconnection',
               'target1': 'Distributor1',
               'target2': 'Account Defense',
               'value': 0.0]],
              ['type': 'setconnection',
               'target1': 'Distributor1',
               'target2': {insert name of target where $ should go after exhaustion},
               'value': 1.0]], 'refreshable': False,
},
]
```

Policy A: — 800
- 805 — Aggregate Limit: $1,000,000
- 810 — Defense Treatment: Defense covered inside limits
- 815 — Policy Period: 1/1/1980 - 12/31/1980

Policy B: — 800'
- 805' — Aggregate Limit: $1,000,000
- 810' — Defense Treatment: Defense covered outside limits
- 815' — Policy Period: 1/1/1981 - 12/31/1981

| paiddate | startdate | enddate | amount | defense | indemnity |
|---|---|---|---|---|---|
| 1/1/2010 | 1/1/1980 | 12/31/1982 | $500,000 | 50% | 50% |
| 1/1/2011 | 1/1/1981 | 12/31/1982 | $500,000 | 50% | 50% |

In this example, the loss information would be converted into a Monetary Stream containing two Monetary Packets as follows:

Monetary Packet #1:
- 2600 — Monetary Packet #1:
- 2610 — amount: $500,000
- 2620 — categories: defense, indemnity
- 2640 — shares: 50%, 50%
- 2660 — startdate: 1/1/1980
- 2680 — enddate: 1/1/1982
- 2690 — paiddate: 1/1/2010

Monetary Packet #2:
- 2600' — Monetary Packet #2:
- 2610' — amount: $500,000
- 2620' — categories: defense, indemnity
- 2640' — shares: 50%, 50%
- 2660' — startdate: 1/1/1981
- 2680' — enddate: 1/1/1982
- 2690' — paiddate: 1/1/2011

FIG. 9

COMPUTER SIMULATED MONETARY ALLOCATION USING NETWORK OF OPERATOR DATA OBJECTS

CROSS-REFERENCE TO RELATED APPLICATIONS

This application is based upon and claims priority to prior U.S. Provisional Patent Application No. 62/694,787, filed Jul. 6, 2018, in the U.S. Patent and Trademark Office, the entire contents of which are incorporated herein by reference.

BACKGROUND

1. Field

The embodiments of the invention relate to extracting financial information to computer simulate monetary allocation.

2. Description of the Related Art

In the context of insurance allocation, as an example, insurance allocation is a mathematical and financial analysis which concerns how to apportion a set of liabilities among insurance policies—generally standard-form commercial liability policies—when multiple policies are triggered by the same losses. These situations arise frequently because large companies purchase numerous policies of this type over time and can have complex liabilities that trigger years or decades of coverage.

Although the individual calculations used to perform insurance allocation may themselves be simple, the ways in which these calculations may need to be combined can be complex, and often require the use of highly specialized computer software. This complexity derives from the terms of the policies, and from the body of case-law which concerns how to correctly interpret these terms. Because of this complexity, to calculate allocation outcomes based upon the policy terms of dozens or hundreds of policies is infeasible without the use of software. Yet current software is not universally applicable in these situations because it relies on the assumption that policies and allocation rules will be one of a few predefined types, whereas real-world situations may involve policy types and allocation rules that cannot be known in advance and may never have been encountered before.

SUMMARY

It is an aspect of the embodiments discussed herein to provide an apparatus including a processor to obtain, from a data source, information of plural rules to allocate a sequence of plural monetary amounts; execute a first transformation to transform the rules into a set of operator objects, to support simulation of conditions to apply the rules to the monetary amounts, and effect of fulfilling the conditions; generate a user interface to support modification of the set of operator objects and links which transfer data and/or control information among the set of operator objects to execute an allocation of the monetary amounts to support the simulation.

It is an aspect of the embodiment described herein to provide an apparatus, comprising a memory, and a processor coupled to the memory to, obtain information indicating plural rules, a rule among the rules to specify a plurality of conditions including at least one monetary threshold condition and at least one corresponding condition for the monetary threshold condition; obtain information about a sequence of monetary amounts; and execute a process to transform the rules into operator data objects that define a logic common to the rules to control allocation of the sequence of monetary amounts to at least one category, wherein the operator data objects form a network of operator data objects to simulate, according to the defined logic common to the rules, allocation of the sequence of monetary amounts in response to passing in sequence the information on the monetary amounts among the network of operator data objects.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2A is data contained by core operator data objects and action objects, according to an example.

FIGS. 2D-2E is an example of a specification.

FIG. 8 is an example use case for two policies.

FIG. 9 is an example use case for loss information.

DETAILED DESCRIPTION OF THE EMBODIMENTS

Figure 1A:
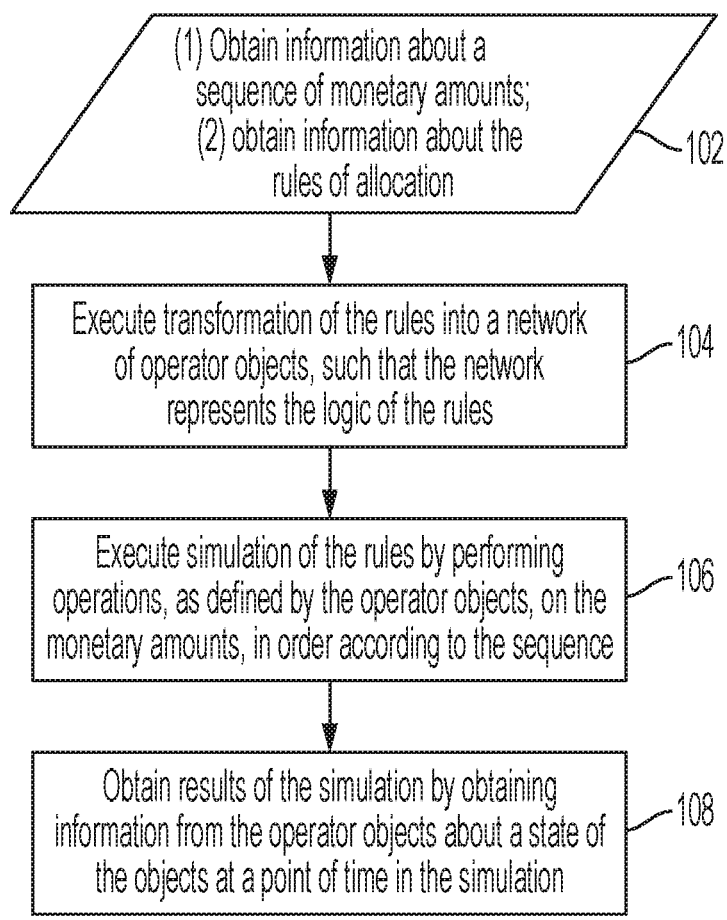
FIG. 1A is a flow chart of a process to allocate monetary amounts, according to an example.

Reference will now be made in detail to embodiments, examples of which are illustrated in the accompanying drawings. In this regard, the embodiments may have different forms and should not be construed as being limited to the descriptions set forth herein. In order to further clearly describe features of the embodiments, descriptions of other features that are well known to one of ordinary skill in the art are omitted here.

The singular forms "a," "an" and "the" are intended to include the plural forms as well, unless the context clearly indicates otherwise.

The term of "and/or" includes a plurality of combinations of relevant items or any one item among a plurality of relevant items.

The term "at least" preceding a listing of items denotes one or any combination of the items in the listing.

The terms "comprise(ing)," "include(ing)," and "have(ing)" when used in this specification, specify the presence of stated features, functions, processes/operations, elements, and/or components, but do not preclude the presence or addition of one or more other features, functions, processes/operations, elements, components, and/or groups thereof.

In the specification, when an element is "coupled," "linked" or "connected" to another element, the elements may not only be "directly connected," but may also be "connected" via another element therebetween. The "coupling" may be mechanical, electrical, optical and/or by way of data communication (communicatively coupled). Also, when a described concept "includes" an element, the described concept may further include another element instead of excluding the other element, unless otherwise differently stated.

The embodiments of the invention relate to processing financial and other information to computer simulate allocation of monetary amounts to categories. For example, embodiments simulate allocation of monetary amounts according to specified rules governing the allocation. In the case of insurance, for example, embodiments simulate allocation of loss among standard insurance policies for commercial liability, where each "category" includes the amount allocated to a particular insurance policy. The embodiments are useful in situations where the required allocation is too complex to be performed by an individual without the assistance of a computer. However, the embodiments may be applicable to financial instruments other than insurance policies, or to any problem that requires allocating monetary amounts among categories, in accordance with a deep logic as described herein.

An apparatus comprising a memory, and a processor coupled to the memory is provided to, obtain, from a data source, information of plural rules to allocate a sequence of plural monetary amounts; execute a first transformation to transform the rules into a set of operator objects, to support simulation of conditions to apply the rules to the monetary amounts, and effect of fulfilling the conditions; generate a user interface to support modification of the set of operator objects and links which transfer data and/or control information among the set of operator objects to execute a simulated allocation of the monetary amounts to support the simulation.

The set of operator objects include, at least one distributor object including information indicative of a combination of the monetary amounts into one category, or split of the monetary amounts between plural categories using a set of parameters including weights, labels, and/or date ranges to control the split of the money among the output connections; at least one account object to store a monetary amount among the monetary amounts corresponding to one of the categories over time; and a trigger object including information to control changes to the set of parameters used by the at least one distributor objects based on a threshold condition on the monetary amounts stored by the at least one account object.

A trigger object among the at least one trigger object includes at least one action object which specifies an event when action in response to a trigger in the trigger object fires including changing the set of parameters of the at least one distributor object.

A second transformation may be executed to convert the set of operator objects into simulated specification data; the allocation of the monetary amounts is executed based upon the simulated specification data.

The simulated allocation includes iteratively executing distribution of the monetary amounts according to at least one distributor object to and/or among at least one account object and accumulating the monetary amounts as balance information, subject to conditions defined in at least one trigger object.

An example of computer simulated monetary allocation using a network of operators is described using insurance policies as an example. Insurance policies define a specific policy period during which the policy will be in effect. They typically also define one or more "limits," where each limit defines a maximum dollar amount that the policy will cover for losses of a particular kind. A policy can be "primary", in which case obligations attach with the first dollar of loss in the policy period, or can be "excess", in which case obligations attach after a loss in excess of a particular dollar amount, or after other policies covering the same policy period have exhausted limits. The dollar amount at which obligations attach is called the policy's "attachment point".

Large companies typically have a portfolio of insurance policies including dozens or hundreds of policies arranged in layers. The term "layer" reflects the fact that, across a company's portfolio of insurance, the limits and attachment points are specified in the terms of each policy such that multiple policies which cover the same period will attach and exhaust in succession, in a predetermined order, as if layered on top of one another. Some policies may be arranged in "quotashare layers," where a quotashare layer is a group of separate policies that have the same policy period and same attachment point, with each policy covering a specified percentage ("quotashare") of each loss that triggers the layer. In this way, the multiple policies of a quotashare layer behave together almost as if they were a single policy.

Current insurance allocation software seeks to automate the process of calculating the correct allocation of loss among a large number of insurance policies. The software receives information about the policy characteristics, allocation assumptions, and losses to be allocated. Typically the loss information consists of information about claim payments made by the policyholder to resolve lawsuits ("indemnity"), and other related costs such as legal fees ("defense costs"). There may be hundreds of thousands of individual claims with losses to allocate. Each individual claim has different characteristics, such as an amount, a range of years during which the loss was incurred, and details about the circumstances of the loss—for example, information about which event or "occurrence" gave rise to the loss. The purpose of allocation software is to calculate the correct apportionment of such losses among the policies, in dollar terms (or in some other currency).

Allocation software currently in use has a fundamental limitation that the current invention largely overcomes. This limitation arises because, due to the many unresolved legal questions, the full set of possible allocation situations that can arise is unknown in principle. Since they are unknown, they cannot be fully specified in software. Current software can specify commonly encountered situations, but cannot cope with new, unanticipated situations.

Current software architectures have this limitation because they are based on concepts which, although generally understood within the industry, have many different variants. These concepts are used routinely by insurance experts—concepts such as the "insurance policy", "layer", "policy tower", "policy chart", and "method of allocation". Software usually uses these concepts as the fundamental building blocks for performing allocations. For example, an insurance policy may be represented internally within the architecture by an insurance policy "object", with data and functions that mirror the characteristics of the insurance policy they represent. This is the current way to proceed because insurance experts routinely work with these concepts.

When implemented in a software architecture, however, the many possible conceptual variants of the concepts familiar to experts are problematic. For example, there are many kinds of policy limits. There are "per occurrence" limits, which set a maximum payout for any one "occurrence" (a term which itself has several meanings). There are "aggregate" limits, which set a maximum payout for the insurance policy overall. A limit may be "annualized", in which case it refreshes at the beginning of each new policy year. Legal defense costs may or may not count toward consuming a particular limit. Various other characteristics of insurance policies also have numerous variants. Likewise, other familiar concepts—layer, tower, method of allocation—have many different variants. Note that the variants relevant here are semantic variants; it is not simply that one policy has a $100,000 limit and another has a $200,000 limit, it is that the meaning of the limit itself varies from one policy to another.

Semantic variability of this kind is challenging for a software architecture because each semantic variant should be accounted for by specific conditions and exceptions—a requirement that tends to propagate to multiple parts of the architecture. An even more difficult challenge in the case of insurance allocation is that the full set of possible semantic variants is unspecifiable, because within the bounds of applicable law the terms of an insurance contract are limited only by the imaginations of the parties to the contract, and because interpretations of policy language change with evolving case-law. Thus any architecture that is based on implementing specific variants of this kind will inevitably encounter variants it cannot handle.

One reason this limitation arises frequently in insurance allocation is that the software is often used in the context of legal disputes over the rules of allocation, where exploring variants of usual concepts is precisely the exercise at the heart of the dispute. In this context, the parties will explore multiple legal theories regarding particular allocation questions, and each legal theory represents, in essence, some variant of a usual concept. If the existing software architecture does not include an implementation of a particular variant, then either the software should be modified or analysts will have to "work around" this limitation in some way. Sometimes there is no adequate work-around, or the required work-around is so difficult and complex as to be infeasible.

To overcome the limitations of existing software for insurance allocation, the current invention for the first time identifies a certain "deep logic" that is characteristic of insurance allocation problems, and then exploits this logic. By defining novel data structures that implement this deep logic rather than specific variants of insurance allocation concepts, the invention is not limited to specific variants. Instead, any monetary allocation problem—including insurance allocation—which follows this logic can be simulated and solved using this invention. For the class of problems which conforms to this deep logic, the invention implements a universal solution that did not previously exist. Also for the first time, this invention can expose this deep logic to the user, both visually and in human-readable text, so that the user can visualize and alter the logic, either through a graphical user interface or a text editor.

This "deep logic" is defined as that which derives from possible combinations of three operations. Each of these operations corresponds to one of three Core Operator objects in the invention. These three objects and corresponding operations are the following:

Distributor: combine monetary amounts into a single category or split monetary amounts between categories using a set of parameters, for example, weights, dates, or labels.

Account: store the sum of monetary amounts that have gone to one or more categories over time.

Trigger: change the set of parameters used by one or more Distributors based on a threshold condition on total monetary amounts stored by one or more Accounts.

Although an example is described as a solution to insurance allocation problems, the solution is applicable to any problem that involves allocating monetary amounts among financial instruments, or among any objects or concepts that correspond to monetary categories, where the allocation rules conform to this deep logic.

Exploiting this logic to simulate insurance allocation—or to simulate any monetary allocation that conforms to this logic—confers several important advantages over prior art computer systems. First, it reduces the allocation steps into combinations of just these three operations. This increases the efficiency of implementing the allocation steps in computer software, because there are just three operations to define instead of numerous variants of insurance policies, financial instruments or other objects or concepts that correspond to monetary categories. Second, it allows the user to combine these same three operations in arbitrary ways that give rise to new and unforeseen allocation logic. This makes it possible to simulate new variants of policies, financial instruments, or monetary categories that have never been encountered previously, without modifying the software at all. No prior art for solving monetary allocation problems has these capabilities.

A third advantage has to do with the fact that any monetary allocation problem which conforms to this deep logic behaves, mathematically, as a "linear system" over intervals of the total allocated amount. To explain why this is true, and how the current invention takes advantage of this fact, it is necessary to first explain how the Core Operators work together to simulate an allocation.

The process of monetary allocation is simulated in two conceptual steps. The first step is to choose a set of Core Operators and to arrange connections between them such that they form a network. Several examples are provided later that illustrate how this step is performed. The second step, conceptually, is to continuously pass monetary amounts to a "first" Distributor, called the Entrypoint, and allow that amount to propagate freely through the network—from Distributors to Distributors, and from Distributors to Accounts, where the amounts accumulate and are stored. While this is occurring, each of several Triggers monitors a particular group of Accounts (in concept). If any Trigger detects that the sum of the amounts among monitored Accounts exceeds that Trigger's threshold, then that Trigger "fires" and performs some action. The action it performs changes something about the network, such that from this point forward, amounts passed to the Entrypoint will be distributed differently among the Accounts. This process—continuously passing amounts into the network, and allowing the amounts to propagate, with occasional action by Triggers to change the network—continues until the total amount to be allocated has been passed into the network. If the network is designed correctly, then the amounts stored in Accounts at the end of this process will correctly represent the results of the allocation. Here, "designed correctly" means that instances of the Core Operators have been assigned parameters and connections within the network such that they collectively represent the logic of the required allocation. Several examples that illustrate how this is done are provided later.

An important feature of this process, described this way, is that it implies continuous monitoring or "polling" (in computer science terminology) by each Trigger to determine whether or not its threshold is crossed. Note that this is a general characteristic of allocation problems of this kind, in which the correct apportionment depends on one or more threshold conditions. In the case of insurance allocation, for example, the correct apportionment of loss changes whenever a policy limit becomes exhausted. This implies that each policy should be continuously "polled" to determine when exhaustion occurs.

A more efficient way to proceed, at least potentially, is to predict what total allocation amount will cause the allocation to change, and to allocate exactly that amount. This consideration underlies the third advantage of this invention. It offers a general solution, for any allocation which conforms to the deep logic of the Core Operators, to the problem of predicting exactly what total allocation amount will cause the next change in the allocation, which obviates the need for continuous polling. This is possible because the Core Operators perform only linear operations up until the point when a Trigger fires. Therefore, while each Trigger in concept performs continuous polling, the total allocation amount which will cause the next Trigger to fire may be predicted without continuous polling. This is true no matter how complex the network of operators is, so long as it consists of just these three Core Operators.

There are two fundamental reasons why this approach has the advantages over prior art as described above. The first reason is that the specific definitions of the Core Operator objects and simulation procedure represent a complete generalization of a specific set of operations. The specific operations happen to be sufficient, on their own and without additional operations, to solve a large class of monetary allocation problems—to solve any allocation problem, in fact, in which the rules of the allocation conform to the deep logic described above. The generalized operations are: (1) separate monetary amounts into arbitrary, but specifically defined, categories and/or subcategories, conditionally, based on information that corresponds to the monetary amounts; (2) apply multiplicative weights to the monetary amounts, conditionally, according to arbitrary, but specifically defined, categories and/or subcategories; (3) store monetary amounts cumulatively, which may be combinations of arbitrary, but specifically defined, categories and/or subcategories according to (1), and which may be subject to arbitrary weights applied to these categories and/or subcategories according to (2); (4) detect each one of multiple arbitrary, but specifically defined, events, wherein a sum of monetary amounts stored according to (3) fulfills one or more corresponding arbitrary, but specifically defined, threshold conditions; (5) upon detection of such an event, cause one or more corresponding arbitrary, but specifically defined, changes to the definitions of the categories and/or subcategories according to (1), or to the defined weights applied to these subcategories and/or subcategories according to (2), where such changes take effect and persist for subsequent operations of the procedure. It so happens that these operations alone, as fully generalized, are sufficient to solve a large class of monetary allocation problems.

The second reason why the approach has the advantages over prior art described above is that by unifying the data and methods needed to perform these generalized operations in the representations of the Core Operator objects as defined here, and also by separating the data and methods of these operations from each other according to the separate definitions of the Core Operator objects as defined here, it is possible to simulate arbitrarily complex variants and combinations of these operations while simultaneously maximizing the efficiency of representing and implementing these operations in a computer system and within computer software. Although the class of allocation problems that can be solved by the Core Operator objects is large, the objects simplify allocation and efficient to implement using a computer.

Specifically, the Distributor data object 200 unifies the data and methods associated with splitting or combining monetary amounts into arbitrary categories and/or subcategories, conditionally, based on information corresponding to each monetary amount. Given this definition, any number of Distributors can then be used to simulate any arbitrary combination of splitting and combining steps, in sequence and/or in parallel, as needed to represent the categories of monetary amounts needed to solve the allocation problem.

Likewise, the Account data object 210 unifies the data and methods associated with tracking an accumulated balance of monetary amounts over time within a specific category and/or subcategory. Given this definition, any number of Accounts can then be used to track any accumulated (record in a chain) sum of monetary amounts over time, by category and/or subcategory, as needed to represent any accumulated sum of monetary amounts needed to solve the allocation problem.

Likewise, the Trigger data object 220 unifies the data and methods which detect the fulfillment of a threshold condition on any arbitrary combination of accumulated monetary amounts stored by Accounts, and the data and methods which cause an arbitrary corresponding change to affect subsequent operations of the simulation. Once the Trigger object has been defined, any number of Triggers can be used to represent each one of any number of threshold conditions, on any accumulated monetary amount, in any arbitrary combination, as needed to represent any conditional change based on a threshold, to any category definition, or to the weights applied to a category, that needs to occur during the course of the procedure in order to solve the allocation problem.

The allocation simulation processes are described in the flowchart of FIG. 1A. First, at 102, information is obtained that serves as the basis for creating a set of operator objects. This includes (1) information about the monetary amounts to be allocated and the order in which to allocate them; (2) information about the rules of allocation, which, in the example of insurance allocation, includes information about the terms of the insurance policies that are potentially involved, and legal precedents that govern interpretation of policy language.

Second, at 104, the rules of allocation are transformed into a set of operator objects such that the objects form a network that represents the logic of the rules of allocation. Here, "network" means that the objects which result from the transformation include data that refers to other objects; since information passes between objects and propagates among objects via these references, these references function as "connections", and the objects and connections together can be considered a network. To implement this process, this transformation of allocation rules into a network could be performed by software automatically, given some inputs, or could be specified in detail using a graphical user interface or text-editing software. Examples of these modalities are provided below.

Third, at 106, a computer simulation is executed, in which the operations defined by the operator objects are applied to the monetary amounts, and corresponding information, in the order of the sequence provided. The definition of the operator objects is such that the simulation will split monetary amounts into categories and/or combine monetary amounts into categories, conditionally based on the rules, possibly with multiple splitting and combining steps, as represented by the particular details of the network. The definition of operator objects is also such that the simulation will cause monetary amounts, and corresponding information, to be stored by objects that correspond to the final allocation categories.

Fourth, at 108, information is obtained from the simulation that represents the allocation results. This information consists of the state of the operator objects that correspond to the final allocation categories. In the example of insurance allocation, the monetary amounts could correspond to a sequence of insurance losses, and the final allocation categories could correspond to insurance policies, where the monetary amount information stored by the corresponding objects represents the amount finally allocated to each policy.

An apparatus includes a memory, and a processor coupled to the memory to, at 102, obtain information indicating plural rules, a rule among the rules to specify a plurality of conditions including at least one monetary threshold condition and at least one corresponding condition for the monetary threshold condition; at 102 further obtain information about a sequence of monetary amounts 250 and 260 (see, for example, FIG. 2C); and at 104, execute a process to transform the rules into operator data objects 200, 210, 220, that define a logic common to the rules to control allocation of the sequence of monetary amounts to at least one category, wherein, at 106 and 108, the operator data objects form a network of operator data objects to simulate, according to the defined logic common to the rules, allocation of the sequence of monetary amounts in response to passing in sequence the information about the monetary amounts among the network of operator data objects. For example, FIG. 8 is an example of rules corresponding to insurance policies.

The information about the sequence of monetary amounts 250, 260 include at least one monetary amount and at least one condition information, respectively, to be processed by the operator data objects to simulate the allocation of the sequence of monetary amounts.

The operator data objects include a set of operator data object types of, a distributor data object 200 including information indicative of a combination of the sequence of monetary amounts into one category among the at least one category, or split of the sequence of monetary amounts between plural categories among the at least one category, using the at least one corresponding condition for the monetary threshold condition to control the combination or split of the sequence of monetary amounts among connections to other operator data objects; an account data object 210 to store a monetary amount based upon the sequence of monetary amounts, corresponding to at least one of the categories; and a trigger data object 220 including information to control changes to the at least one corresponding condition for the monetary threshold condition and/or the monetary threshold condition, used by a distributor data object, based on monetary amounts to be stored by an account data object.

The storing of a monetary amount based upon the sequence of monetary amounts by the account data object includes storing at least a portion of at least one of the monetary amounts among the sequence of monetary amounts.

The at least one corresponding condition for the monetary threshold condition includes a set of parameters including any one or combination of parameters including weights, labels, and/or date ranges.

A trigger data object 220 among the at least one trigger data object includes at least one action object 230 which specifies an action in response to satisfying a monetary threshold condition, the action including changing at least one parameter in the set of parameters of the at least one distributor data object.

A simulation of the allocation of the sequence of monetary amounts includes, iteratively performing a process to distribute the sequence of monetary amounts from the at least one distributor data object to the at least one account data object to accumulate at least a portion of at least one of the monetary amounts among the sequence of monetary amounts according to the at least one category and subject to the at least one monetary threshold condition and the at least one corresponding condition in the at least one trigger data object.

According to an example, an apparatus includes a memory to store a network of operator data objects 200, 210, 220, 230 corresponding to a transformation of rules into operator data objects that define a logic common to plural rules to control allocation of a sequence of monetary amounts to at least one category, a rule among the rules to specify a plurality of conditions including at least one monetary threshold condition and at least one corresponding condition for the monetary threshold condition; and a processor coupled to the memory to implement an allocation engine (see, for example, FIG. 3) to, obtain information about the sequence of monetary amounts; and execute a process to simulate, according to the network of operator data objects that define the logic common to the plural rules, allocation of the sequence of monetary amounts in response to passing in sequence the information about the monetary amounts among the network of operator data objects.

Execution of the process to transform the rules, includes generation of a user interface (see, for example, FIGS. 2B, 5, 10, 11, 12) to support construction of the operator data objects and connections among the operator data objects to define the logic common to the rules and form the network of operator data objects to pass the information on the sequence of monetary amounts and/or control information among the operator data objects to execute simulation of the allocation of the sequence of monetary amounts.

According to examples, the at least one rule among the rules represents logic to allocate the sequence of monetary amounts to at least one category for any one or combinations of insurance policy, money account, or a financial instrument.

Figure 1B:
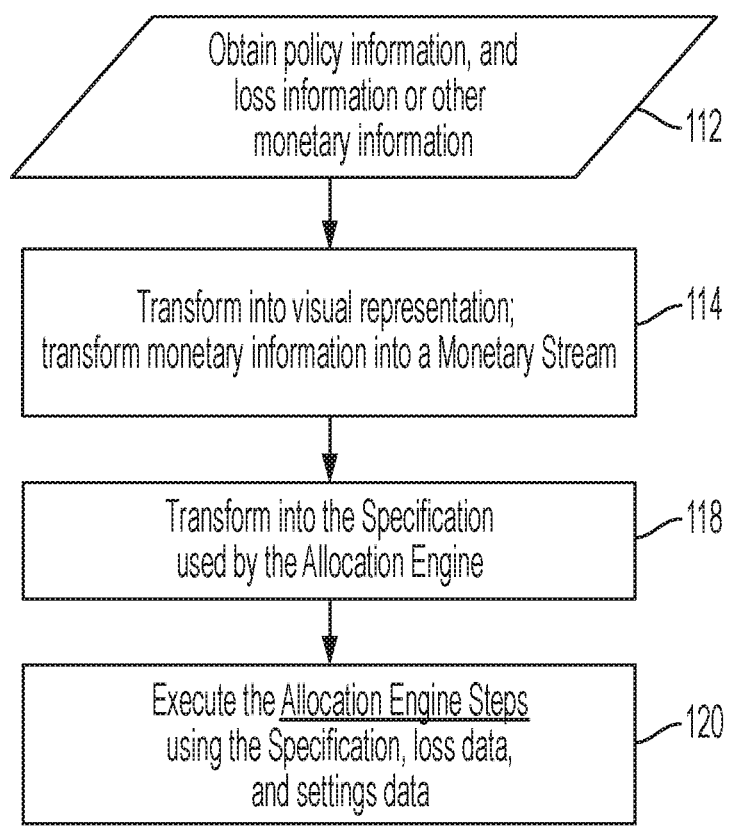
FIG. 1B is a flow chart of a process to allocate monetary amounts in context of insurance allocation, according to an example.

In FIG. 1B, one possible embodiment of the allocation steps is detailed in the context of insurance allocation, based on the Core Operator objects. At 112, as well as loss data or other monetary amount data are obtained. At 114 this information is transformed into a visual representation of the Core Operator objects.

The data structures of the Core Operators are defined in FIG. 2A. The first Core Operator is Distributor 200. It has the following properties: "name" 201, which is a unique identifier for each instance of Distributor; "entrypoint" 202, which is a Boolean flag that identifies whether this Distributor serves as the Entrypoint Distributor; "connections" 203, which is a set of references to other Distributors or Accounts to which this Distributor connects; "connectionvalues" 204, which is a set of values that correspond to the connections; "refreshable" 206, which is a Boolean flag that determines whether the values of connectionvalues can be restored to original values during the Refresh Steps (described below); and "propagationpercent" 208, which is a value stored during the Propagation Steps (described below).

Each reference contained in the connections (203) of a Distributor means that monetary amounts can be passed from the Distributor to the referenced object during the Propagation Steps. Each corresponding value of connectionvalues (204) serves as a modifier of the passed amount. These values can be numbers, date ranges, or labels. If the value is a number, then it serves as a weight, and the amount is multiplied by the value. If the value is a label, then it serves as a filter, and only a portion of the amount which corresponds to the label is passed through the connection. If the value is a date range, then a separate procedure ("Pro Rata Steps") determines the amount passed through that connection. (See Propagation Steps below.)

The second Core Operator is Account 210. It has the following properties: "name" 211, which is a unique identifier for each instance of Account; "connections" 212, which is a set of references to Trigger objects to which the Account connects; "storedamount" 214, which is a monetary amount accumulated during iterations within the Allocation Engine Steps (described below); "refreshable" 216, which is a Boolean flag that determines whether the value of "storedamount" will be restored to its original value during the Refresh Steps (described below); "propagationpercent" 218, which is a value stored during the Propagation Steps (described below).

Each reference contained in the "connections" of an Account means that the referenced Trigger includes the amount stored by the Account when testing its threshold condition, as explained below.

The third Core Operator is a Trigger 220. It has the following properties: "name" 221, which is a unique identifier for each instance of Trigger; "threshold" 222, which is a numeric value that functions as a threshold for activating the Trigger's actions; "actions" 224, which is a set of references to Action objects (described below); "fired" 226, which is a Boolean flag that indicates whether the actions have been executed; "refreshable" 228, which is a Boolean flag that determines whether the "fired" flag can be reset to "False" during the Refresh Steps (described below).

The function of the Trigger is to detect when a monetary threshold condition has been fulfilled during execution of the simulation, and to cause at that time a change to the network that affects subsequent simulation steps. Many examples of this function are described below in the context of insurance allocation. The examples include simulation processes corresponding to attachment of a policy, exhaustion of a deductible, exhaustion of policy limits, and renormalization of shares within a quotashare layer after each policy within the quotashare layer exhausts. The Core Operator specific definitions are such that the logic of detecting an event during the simulation is separated from causing a change to the network as a consequence of that event. This separation allows for arbitrary combinations of causes and effects within the simulation.

The data contained in the Action object 230 is also shown in FIG. 2A: " type" 232 is a designation of the type of the Action, such as "setconnection"; "target1" 234 is a reference to a Distributor; "target2" 236 is a reference to a Distributor or Account to which the Distributor referenced in target1 233 connects; if type 232 is "setconnection", then "value" 238 is the value to which a corresponding member of the set connectionvalues (204) will be set when the Action is executed. The meaning of these references in target1 and target2 is explained later in the context of the Action Steps. The Action object 230 could be defined to be part of a Trigger data object, but since a Trigger data object may have references to multiple Action objects, it is convenient for purpose of describing to illustrate the definitions separate.

Figure 2B:
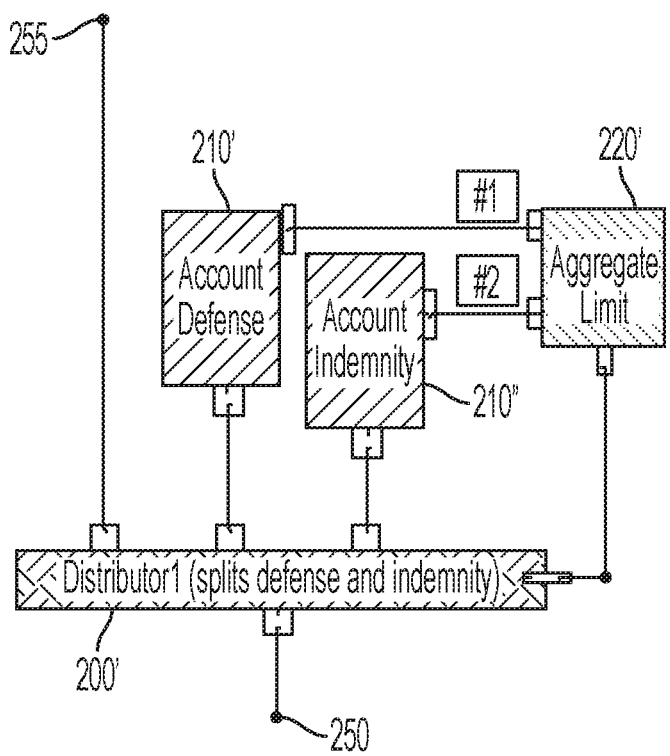
FIG. 2B is a visual representation of the implementation of the logic of an insurance policy, according to an example.

As one example of how the transformation at 114 would occur, suppose that the information obtained at 112 concerns a single insurance policy. This is a greatly simplified example for illustration purposes; in a real-world example the required logic will be more complex. According to the information obtained at 112, the insurance policy has an aggregate limit of $1,000,000 and has no per-occurrence limit or other defined limits. In this simplified example, the policy information could be automatically transformed into the visual representations of four Core Operator objects, as shown in FIG. 2B. These operators are a Distributor 200', two Accounts 210' and 210", and a Trigger 220'. The visual representations of these operators could also be automatically connected with lines as shown, where these lines indicate visually how certain data or control information passes via connections among the operators. Note that in the case of connections from a Distributor to a Distributor, from a Distributor to an Account, or from an Account to a Trigger, the line depicted in the figure is a representation of the "connections" property (203 or 212) of a corresponding object of the connection, whereas in the case of a connection from a Trigger to a Distributor (for example, from 220' to 200'), the line indicates the connection between the "target1" property (2201-1) of an Action object referenced by the "actions" property (224) of the corresponding Trigger. This convention is also followed for all examples below.

Figure 2C:
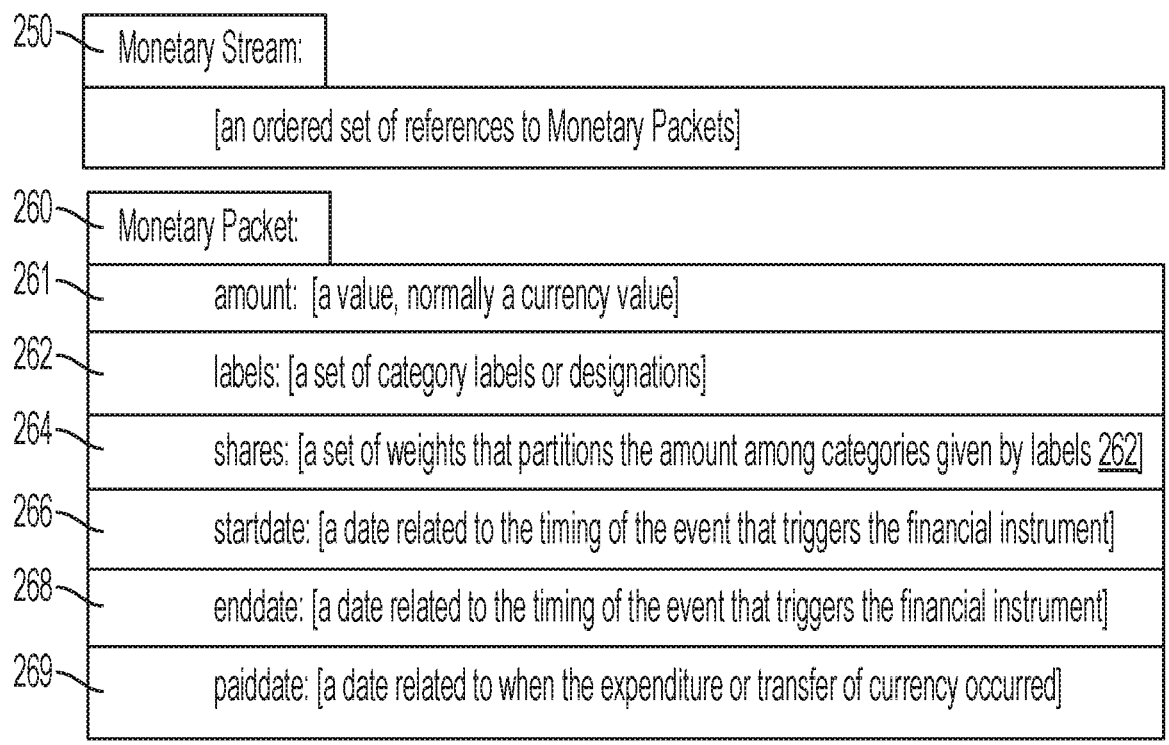
FIG. 2C is loss information or other input monetary information, according to an example.

Also at 114, the monetary amount information is transformed into the data structures shown in FIG. 2C, which includes, in this embodiment, a "Monetary Stream" (250) and a "Monetary Packet" (260). The Monetary Stream (250) is an ordered set of references to Monetary Packets (260). A Monetary Packet has the following properties: "amount" (261), which is a value representing a monetary amount; "labels" (262), which is a set of labels or designations; "shares" (264), which is a set of weights that partitions the amount among categories defined by the corresponding labels (262); "startdate" (266), which is a date related to the timing of the monetary information; "enddate" (268), which is another date related to the timing of the monetary information; and "paiddate" (269), which is a date related to when the expenditure or transfer of monetary amounts occurred or will occur, here between the insurance company and the policyholder.

Also at 114, a single Distributor is designated as the Entrypoint Distributor. This is the one Distributor in the network with entrypoint (202) set to "True". Conceptually, this property identifies this Distributor as the object in the network to which monetary amounts are initially passed at the start of the simulation. In effect, monetary amounts propagate through the network from this initial starting point. As applied to this embodiment, the term "network" refers to the fact that the set of Distributor, Account, Trigger and Action objects used to solve a particular problem will be specified to have connections between them as defined by the properties 203, 212, 234 and 236. Through these connections, objects affect the operations of other objects, and monetary amounts propagate, in effect, from one object to the next, as if through a network.

At 118, the visual representation is transformed into a text representation, which serves as the Specification used by the Allocation Engine Steps (described below). An example of a Specification is shown in FIGS. 2D-2E, which could be created at 114 as the result of transforming the visual representation of FIG. 2B. The Specification consists of four groups of properties enclosed in brackets, where each group corresponds to an instance of one of the Core Operators in the visual representation. The brackets at 2001 correspond to Distributor 200', the brackets at 2101 correspond to Account 210', brackets at 2102 correspond to Account 210", and brackets at 2201 correspond to Trigger 220'.

At 120, the Allocation Engine Steps (FIG. 3) are performed. At the end of the Allocation Engine Steps, the simulation is complete. First, at 305, the Specification and Monetary Stream is obtained, and the Core Operator objects and connections among them are created. The Monetary Stream represents an ordered sequence of monetary amounts—such as insurance loss amounts in the case of insurance allocation—and may be supplied or obtained, for example, by/from a user, or a computer system. One instance of a Core Operator is created for each set of brackets in the Specification. The Core Operator will be either a Distributor 200, Account 210, or Trigger 220, which is specified by the 'type' property enclosed in the associated brackets. For example in the Specification of FIGS. 2D-2E, the brackets at 2001 enclose the 'type' property 2001 with the value 'distributor'. Therefore at 305 in the Allocation Engine Steps, a Distributor 200 will be created that corresponds to this set of brackets. Likewise, in this example two Account objects (or "Accounts") and a Trigger object (or "Trigger") would be created.

Also at 305, these Core Operators are initialized using the property values enclosed in the corresponding brackets of the Specification. For example, in the Specification of FIGS. 2D-2E, the brackets at 2001 include 'name', 'entrypoint', 'connections', 'connectionvalues' and 'refreshable' properties. The properties of the Distributor created at 305 will therefore be initialized with the corresponding values of these properties at 2001 in FIGS. 2D-2E. Likewise, the two Accounts and the Trigger will be initialized with corresponding property values from the Specification at 2101, 2102, and 2201. In the case of the Trigger, one Action object will be created for each set of inner brackets within the Actions property. The properties of each Action object will be initialized with the corresponding property values from the Specification, for example at 2201-0, 2201-1, 2201-2 and 2201-3.

Figure 6:
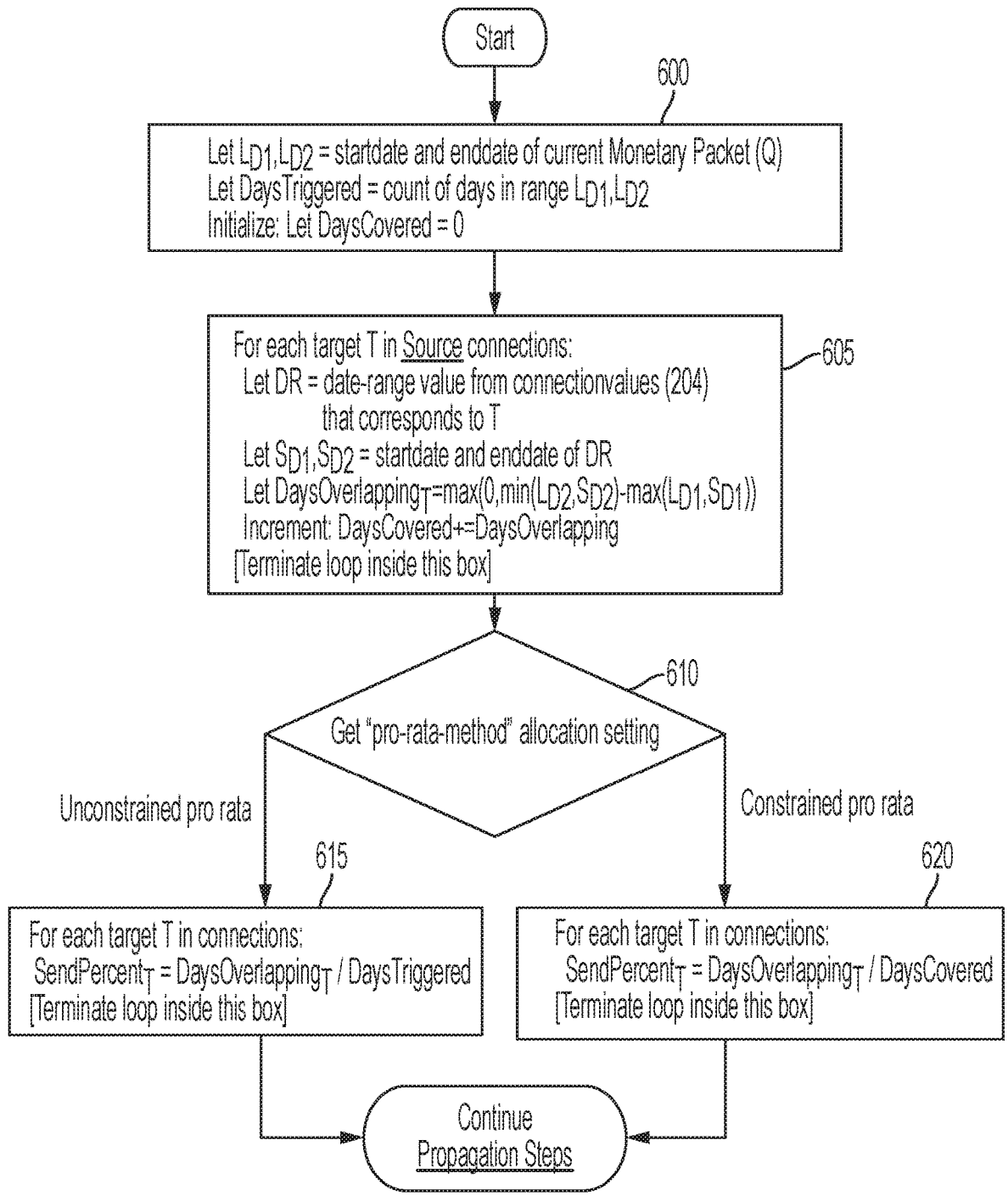
FIG. 6 is a flow chart of a pro rata split process, according to an example.

Next, within the Allocation Engine Steps (FIG. 3) at 310, an "outer loop" of repeating instructions is entered, within which an "inner loop" is entered at 320. These loops comprise the main calculation steps of the allocation procedure. At 310, the next (or first) Monetary Packet (Q) in sequence is drawn from the Monetary Stream. At 315, the Refresh Steps are performed (if necessary, as discussed later). At 320, the Propagation Steps are executed (FIG. 4) followed by the Minimum Trigger Steps (FIG. 6).

If the user setting "refresh-on-every-step" (315) is set to "True", then The Refresh Steps are executed. For each Core Operator object that has a refreshable property (206, 216, 228) set to "True", the Refresh Steps simply restore each object to its initial state at the start of the simulation. For purposes of simulating insurance allocation, there are specific situations where this is useful. For example, in some situations each separate loss covered by a policy would be treated as a separate "occurrence". If the policy terms also define a "per occurrence limit", then the desired treatment is that a separate full limit is available to cover each loss. To simulate this logic using the Core Operators, it is useful if specific instances of Core Operators are restored to their initial state after each loss. The "refreshable" property of the Core Operators (at 206, 216 and 268) is included to enable simulating this logic. Specifically, for instances of the Core Operators with the "refreshable" property set to "True", the state of the object will be restored to its initial state at 315 within the Allocation Engine Steps. For Triggers, this means the fired property 226 will be restored to False. For Distributors, this means the current values in connectionvalues 204 will be restored to the original values given in the Specification. For Accounts, this means the storedamount 214 will be restored to the value given in the Specification.

Conceptually, the Propagation Steps and Minimum Trigger Steps together implement a "shortcut" that obviates the need to frequently "poll" each Trigger in order to determine whether its threshold condition has been satisfied. Instead, as discussed above, it is possible to predict the total allocation amount that will cause the next Trigger to fire, and then allocate exactly that amount.

Figure 5:
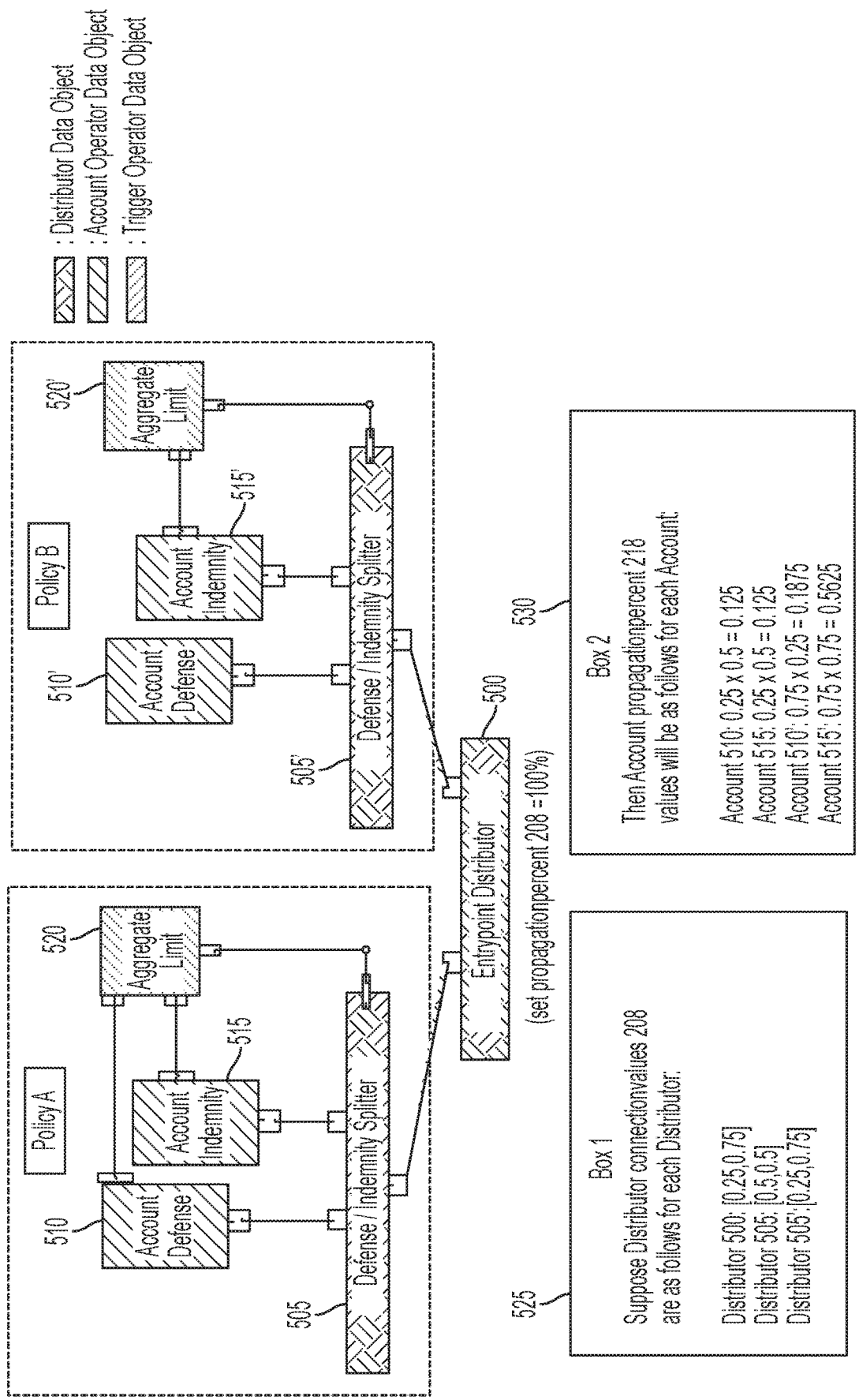
FIG. 5 is a two-policy example of propagation.

The purpose of the Propagation Steps is to implement the first step of this prediction, which is to determine what percent of the next amount to be allocated will go to each Account, given the current state of Distributors and Accounts. The word "propagation" is used because the allocated amount will, in effect, propagate along each available path defined by connections from Distributor to Distributor and also from Distributor to Account. FIG. 5 illustrates how this would work in an example with two policies, using a visual representation of the Core Operators. Again, the example of FIG. 5 is greatly simplified for illustration purposes.

Figure 4:
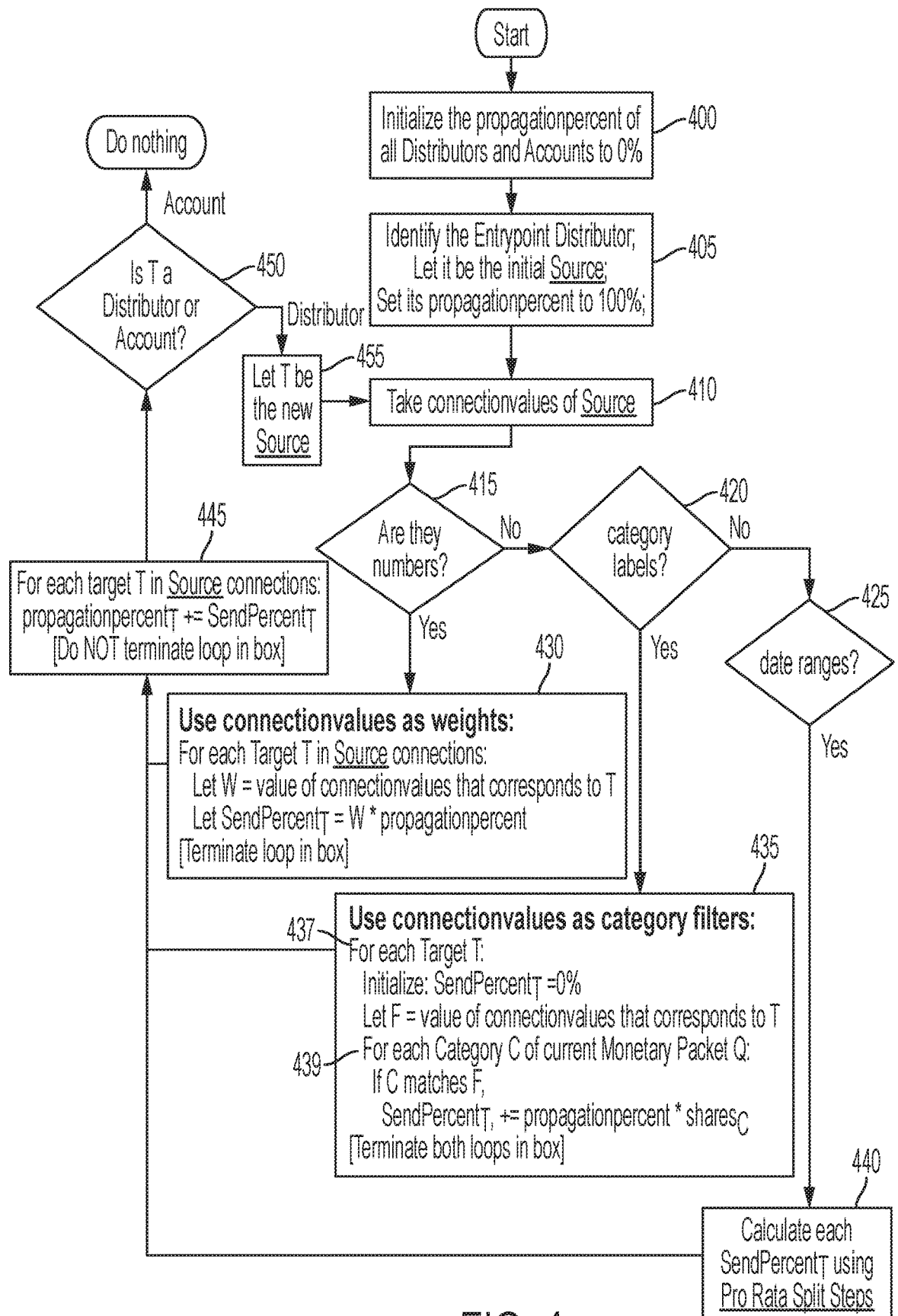
FIG. 4 is a flow chart of a propagation process, according to an example.

In the example of FIG. 5, and according to the flowchart of FIG. 4, suppose the first monetary amount is passed to the Entrypoint Distributor 500. Because this Distributor has two connections, one to Distributor 505 and another to Distributor 505', the monetary amount will first propagate to these two Distributors. From here the amount will propagate to Accounts 510 and 515 inside Policy A, and also between Accounts 510' and 515' inside Policy B. At each Distributor, the percent of the current monetary amount that passes to each connection depends on the connectionvalues (204) of the distributor where the split occurs. In this example, these values are numbers, and therefore serve as weights. To determine what percent of the amount entering at Distributor 500 will go to each Account, multiply the weights along the path between the Entrypoint Distributor and the Account in question. For example, suppose the weights are those given as connectionvalues at 525 (Box 1). In that case, the propagationpercent 218 for each Account will be set to the values shown at 530 (Box 2). This example also illustrates that the Distributor acts as a linear operator, as discussed above; here each distributor performs vector multiplication, a linear operation, where the connectionvalues property serves as a vector of weights.

The Propagation Steps, detailed in FIG. 4, are a straightforward generalization of the steps executed in the example above, except that they also allow for the possibility that the connectionvalues (204) of a Distributor may contain labels or date ranges instead of numbers. At 400, the propagationpercent property 208 and 218 of every Account and Distributor is initialized to 0%. At 405, the Entrypoint Distributor is identified and defined as "Source" for subsequent steps. Next the propagationpercent of Source is set to 100%. At 415, the procedure branches depending on whether connectionvalues 204 of Source are numbers, labels, or date ranges.

At 415, if connectionvalues of Source are numbers, then at 430, the values are treated as weights as follows. For each target object T in connections 203, the propagationpercent of Source is first multiplied by the corresponding weight from connectionvalues. Next, at 445, the result of that multiplication is added to the propagationpercent property of T. The Propagation Steps then continue as described below, at 450.

Alternatively, at 415, if connectionvalues of Source are labels, then at 435 the values are treated as category filters as follows. At 437, enter a loop. Take the next target object T in connections 203. Initialize a quantity $SendPercent_T$ to be equal to 0%. Let F be the label of connectionvalues that corresponds to target T. At 439 enter another loop. For each value C of labels 262 of the current Monetary Packet Q, if C matches F, then increase $SendPercent_T$ by the quantity (propagationpercent×$share_C$), where "propagationpercent" is the propagationpercent property of Source, and $share_C$ is the value of the shares property 264 of Q that corresponds to value C. When the loop that starts at 439 terminates, re-enter the loop that starts at 437. When the loop that starts at 437 terminates, continue to step 445. At 445, for each target T, add $SendPercent_T$ to the propagationpercent of T. Conceptually, if connectionvalues contains labels, then for each matching Monetary Packet label (262), allow only the corresponding share of the amount to pass through the connection. In one embodiment, label C and label F "match" if they consist of an identical sequence of alphanumeric characters, but any definition of "match" will suffice, as long as that definition allows distinguishing between the categories relevant to the allocation problem. The Propagation Steps then continue as described below, at 450.

Alternatively, at 415, if connectionvalues are date ranges, then at 440 the values are treated as simulating the coverage period of an insurance policy or other financial instrument. The steps for performing this calculation are the Pro Rata Split Steps (FIG. 6). The calculation simulates the "time-on-risk" concept, which is a standard concept in the insurance industry. For insurance policies, if several policies are triggered by the same loss, which is represented here by the Monetary Packet (Q), then the amount allocated to each policy is proportional to the number of days triggered that fall within the policy's period. The steps are as follows. At 600, the number of days between startdate (266) and enddate (268) of the current Monetary Packet Q is determined; this is DaysTriggered. At 605, for each target T of connections 203, take the range of days between the startdate (266) and enddate (268) of Q and determine the number of these days that overlap with the date-range value of connectionvalues that corresponds with the connection to target T; the result is $DaysOverlapping_T$. Also at 605, calculate the sum of $DaysOverlapping_T$ for T, for example, all T; this is DaysCovered. A user setting specifies whether the allocation method is "constrained pro rata" or "unconstrained pro rata." At 610, if the pro-rata-method is "unconstrained", then at 615 the amount sent to each target T is given by $SendPercent_T=DaysOverlapping_T/DaysTriggered$. If the pro-rata-method is "constrained", then at 620 the amount sent to each target T is given by $DaysOverlapping_T/DaysCovered$. Return from the Pro Rata Split Steps to the Propagation Steps at 445. For each target T of Source, add $SendPercent_T$ to the value of the propagationpercent property of T. Continue at 450 below.

At 450, if T is a Distributor, then T replaces Source at 455, and the loop restarts at 410. This loop continues until the propagationpercent (218) of Account objects, for example, all Account objects, for which there is at least one path through the network via one or more successive connections beginning with the Entrypoint Distributor has been determined. When the Propagation Steps terminate, the propagationpercent (218) of each Account represents the percent of the next allocation amount that the Account will receive—given the current state of connections and connectionvalues of objects in the network, as long as these connections and connectionvalues do not change. (This fact is exploited again in the Allocation Engine Steps at 325 in order to determine the correct amount for each Account). From here the process returns to the Allocation Engine Steps, at 320.

Figure 7:
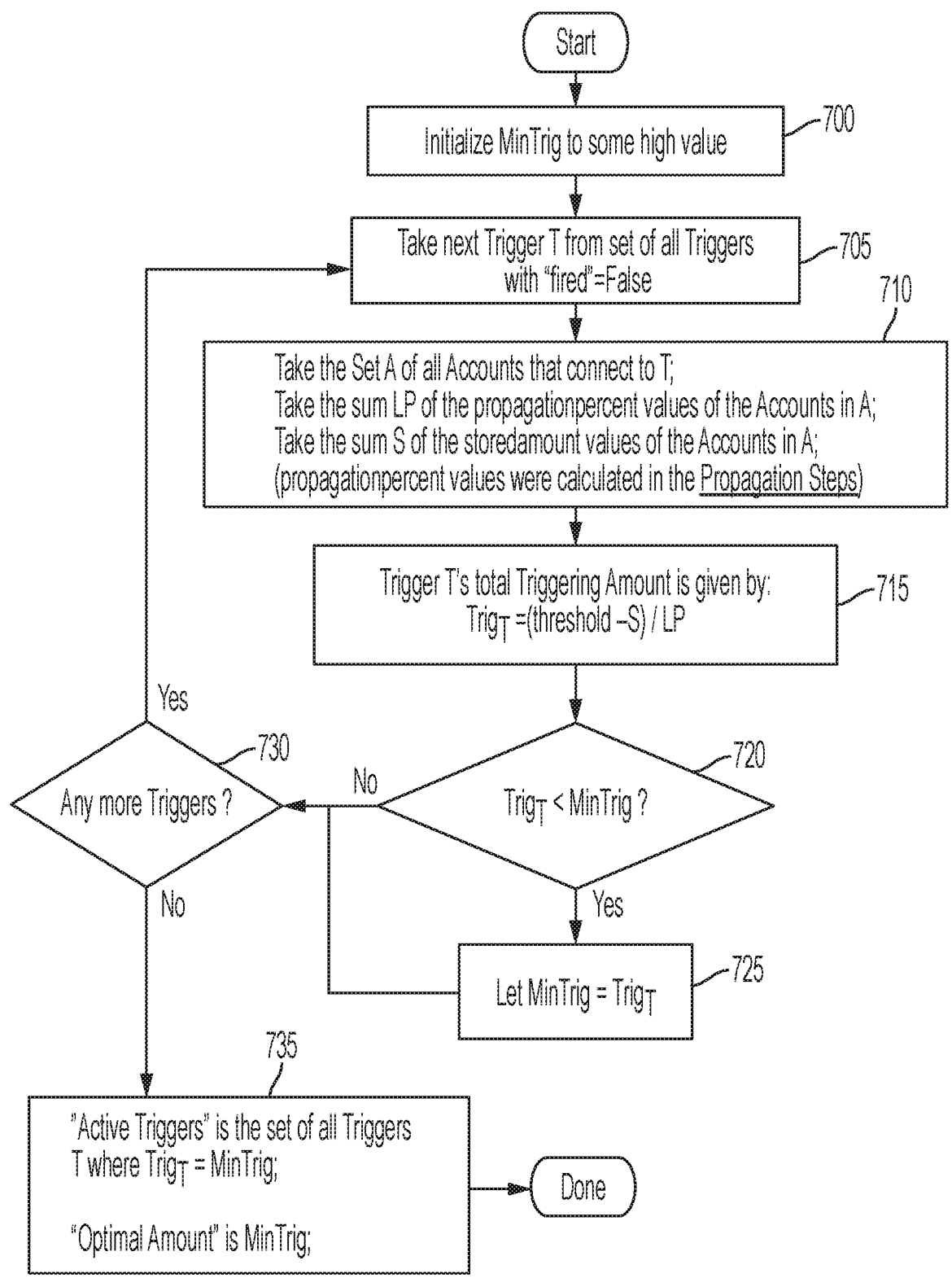
FIG. 7 is a flow chart of a minimum trigger process, according to an example.

After completion of the Propagation Steps above, the Minimum Trigger Steps are executed at 320, as detailed in FIG. 7. The purpose of the Minimum Trigger Steps is to predict the total allocation amount that will cause the next Trigger to fire, so that exactly that amount can be allocated.

The concept of the Minimum Trigger Steps is best summarized by returning to the example of FIG. 5. Recall that for each Trigger, the amounts stored (storedamount 215) by each monitored Account (those that have a connection to the Trigger) are summed, and then this sum is compared to the threshold (222) of the Trigger. In the example of FIG. 5, Trigger 520 receives connections from Account 510 and 515. Therefore, the threshold condition will be satisfied when the sum of the amounts stored in Account 510 and 515 exceeds the threshold (222) of Trigger 520. Suppose the Accounts have the propagationpercent (218) values shown in 530 (Box 2). Suppose also that the threshold of Trigger 520 is $1,000,000, and that all Account objects currently have an amount of $0 (storedamount 215). Then the total allocation amount that will satisfy the threshold condition of Trigger 520 is given by $1,000,000/(0.125+0.125)=$4,000,000. Now consider Trigger 520', which receives a connection only from Account 515'. Suppose its threshold is also $1,000,000. Then the total allocation amount that will satisfy the threshold condition of Trigger 520' is given by $1,000,000/0.5625=$1,777,777. Trigger 520' will fire after a lower total stored amount than Trigger 520, therefore Trigger 520' will be the next Trigger to fire, and the amount which will cause it to fire is $1,777,777. This is the optimal amount to allocate. To further clarify the example, note that if account 520' has a stored amount of $437,500 instead of $0, then the optimal amount is instead given by ($1,000,000−$437,500)/0.5625=$1,000,000.

The Minimum Trigger Steps (FIG. 7) generalize the procedure followed in the above example. At 700, the quantity MinTrig is first initialized to an arbitrary high value. At 705, the next Trigger T is taken from the set of all Triggers where the fired property 226 is "False". At 710, the propagationpercent values of all Accounts that connect to T are summed (propagationpercent 218); the result is LP. Also the value of the storedamount property of all Accounts that connect to T are summed (storedamount 214); the result is S. Next, the total allocation amount that would satisfy the threshold condition of T (threshold 222) is calculated using the equation at 715; the result is $Trig_T$. At 720, if TrigT is not less than MinTrig, then 730 is executed; otherwise MinTrig is set equal to $Trig_T$ at 725, and then 730 is executed. At 730, if any Triggers remain, then these steps are repeated for the next Trigger T at 705; otherwise, at 735, ActiveTriggers is defined to be the set of all Triggers T where TrigT=MinTrig, and OptimalAmount is set equal to MinTrig.

At 325, after executing the Propagation Steps and the Minimum Trigger Steps, a total allocation amount is apportioned to Accounts according to propagationpercent 218. Note that the propagationpercent of each Account was calculated during the Propagation Steps, but is used again here (at 325) to determine what amount will go to each Account now that the total allocation amount is known. These steps are as follows: let A be the amount 261 of Q; let M be the smaller of A and OptimalAmount O; for each Account, increase the value of storedamount 214 by the quantity (M×propagationpercent$_A$), where propagationpercent$_A$ is the propagationpercent 218 of Account A; reduce the amount 261 of Q by the quantity M.

At 330, Trigger actions are executed. In concept, the Trigger actions are the procedures whereby satisfying a threshold condition causes a change in the network that will affect the allocation of subsequent monetary amounts. The Trigger actions are executed as follows. Take each Trigger T in ActiveTriggers, set its fired property (226) to True. For each T, take each action object A of the Trigger actions (224). If the type 232 of A is "setconnection", then do the following: (1) take the Distributor D referenced as target1 (234) of A; (2) determine which value of the connectionvalues (204) of D corresponds to the connection from D to target2 (236) of A; (3) set this value equal to the value (238) of A. Other action types (i.e., other than "setconnection") are described later.

At 340, if the remaining amount 261 of Q is greater than $0, then steps are repeated beginning from 320. Otherwise, at 345 if there are Monetary Packets remaining, then steps are repeated beginning from 310. If, at 345, there are no Monetary Packets remaining, then the allocation is done.

The Allocation Engine Steps (FIG. 3) can therefore be summarized as follows. First initialize the Core Operators and the connections between them. Next enter an "outer loop" of repeating instructions, within which an "inner loop" of repeating instructions is nested. These loops comprise the critical steps of the allocation procedure. In the outer loop, draw Monetary Packets one at a time from the Monetary Stream, and pass the next one to the inner loop. In the inner loop, first predict the smallest portion of the current Monetary Packet that is sufficient to cause the next Trigger to "fire" (i.e., satisfy the threshold condition), then allocate exactly that amount. Since this causes the identified Trigger (or Triggers) to fire, execute the actions associated with that Trigger (or Triggers). These actions change the network of Core Operators, such as by changing the connection weights, such that the next amount will be allocated differently. Repeat the inner loop, drawing successive portions of the current Monetary Packet until the remaining amount is zero. At that point the inner loop exits and the next Monetary Packet is drawn in the outer loop. The steps proceed in this way until Monetary Packets in the Monetary Stream have been drawn and the amounts allocated. At that point the allocation is complete.

The process outlined above would be executed in software in the context of a complete system for insurance allocation, which could be a four-layer software architecture, for example. The four layers are (1) an Allocation Engine, which creates instances of the Core Operators and the connections among them, based on a text Specification provided as input, then executes the allocation calculations according to the Allocation Engine steps; (2) a Design Layer, which generates a visual representation of the Core Operators and the connections among them, either by using a graphical user interface or by using the other layers, then transforms this visual representation into the Specification used by the Allocation Engine; (3) a Framework Layer which, for specific variants of insurance policies, or other financial instruments, or other monetary categories, and for specific variants of the allocation rules, transforms data describing these variants into a graphical representation of the three Core Operators; (4) a Surgery Layer, which defines certain routines that allow a user to make large numbers of changes to the logic of the allocation, by routines that either simultaneously change many components within the visual representation in the Design Layer, or simultaneously change many elements in the text Specification used by the Allocation Engine.

Figure 10A:
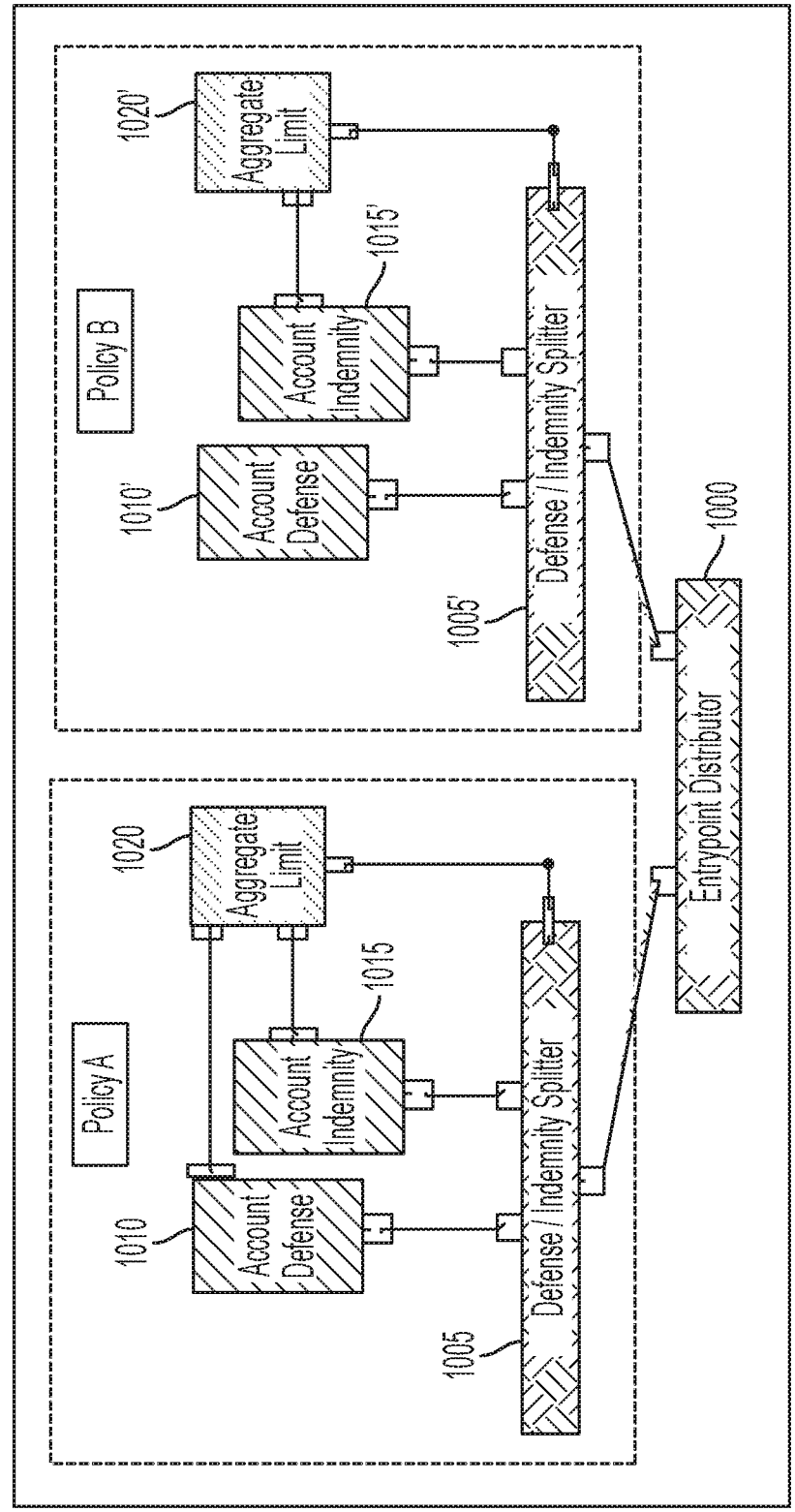
FIGS. 10A-10B is an example use case according to a visual representation.
Figure 10B:
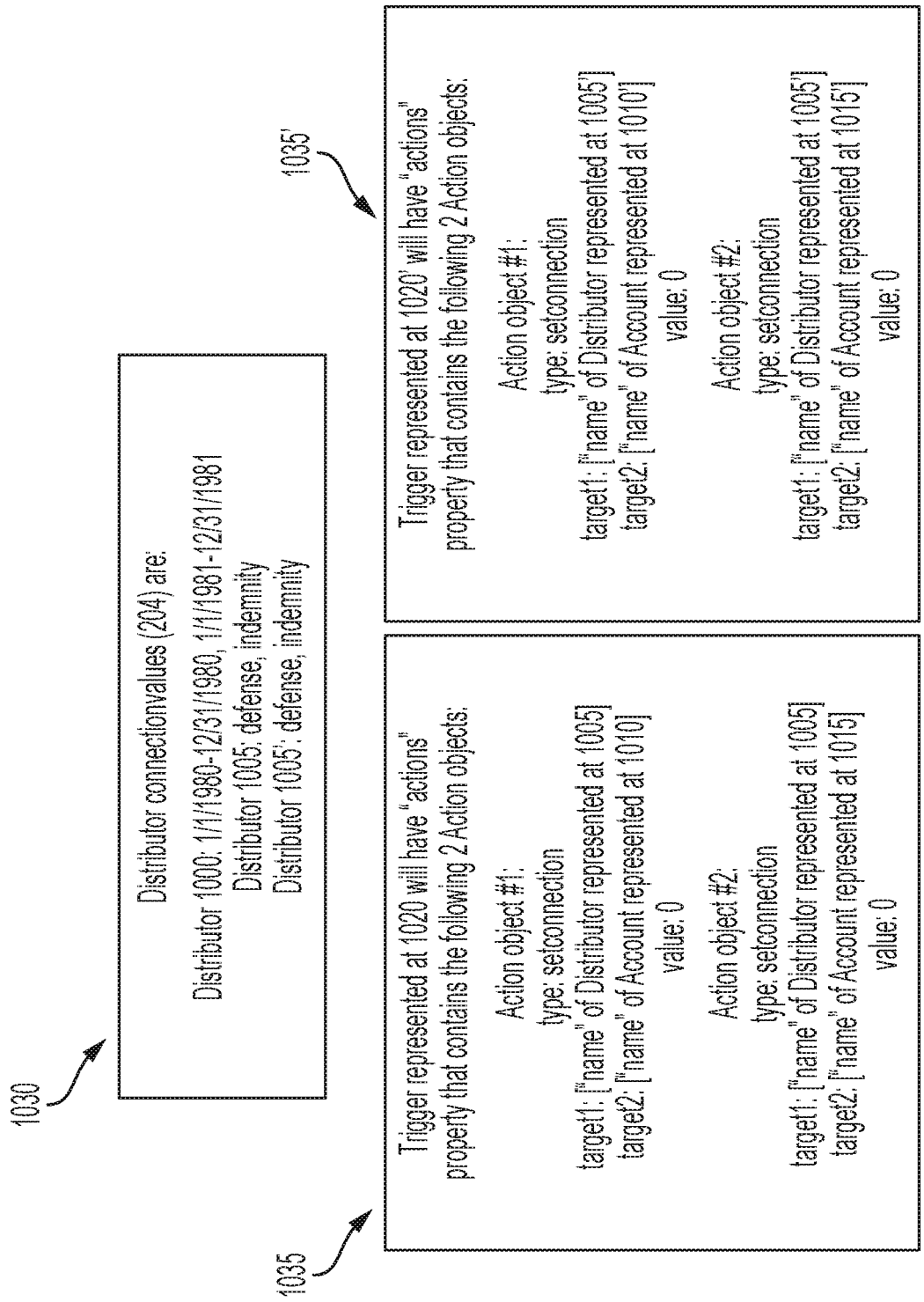

For example, suppose information is provided about the terms of two insurance policies, as shown in FIG. 8, as well as a table of loss information as shown in FIG. 9 at 900. Again, the example has been greatly simplified for illustration purposes; in a real-world allocation problem, the logic will be more complex. Suppose a "pro rata allocation" between the two policies needs to be calculated. Recalling the steps of FIG. 1 at 114, the Framework Layer transforms the policy information into a visual representation of the required Core Operators and the required connections between them, as shown in FIGS. 10A-10B at 1025 and detailed below. The connectionvalues property (204) of each created Distributor is shown at 1030. Also at 114, the loss information is converted into two Monetary Packets 260, as shown in FIG. 9 at 2600 and at 2600'.

In this example, because Policy A 800 and Policy B 800' have different policy periods (815 and 815'), the Framework Layer automatically assigns connectionvalues 204 of Distributor 1000 according to the policy periods 815 and 815' of the two policies (see 1030). This is important because, at 440, the Allocation Engine will split each received Monetary Packet (260) on a pro-rata basis, in proportion to the extent of overlap between each policy period and the period defined by the start- and end-date of each loss as explained in detail above. In this example, the first Monetary Packet 2600 representing such a loss has a two-year period (2660 and 2680) which overlaps with the policy period 815 of Policy A 800 for one year, and which overlaps with the policy period 815' of Policy B 800' for one year. Therefore 50% of the amount of the first Monetary Packet will go to Policy A and 50% will go to Policy B. The second Monetary Packet 2600' has a one-year period (2660' and 2680') which overlaps only with the policy period of Policy B. Therefore 100% of the second Monetary Packet amount will go to Policy B. The connections indicated by lines from the Distributor represented at 1000 to the Distributors represented at 1005 and 1005' mean that these amounts will propagate from 1000 to 1005 and 1005'. This arrangement simulates the logic of how the two insurance losses trigger the two insurance policies differently, given a pro rata insurance allocation rule.

Also, because in this example the loss information indicates two categories of monetary amounts—"defense" and "indemnity" (2620, 2620')—the Framework Layer creates a Distributor visual representation within each policy, as shown in FIG. 10 at 1005 and 1005', where the Distributor connection values 204 will be set as labels "defense" and "indemnity" as shown at 1030. This is important because, since the connectionvalues 204 are labels that correspond to the categories of monetary amounts, the Allocation Engine will split each monetary amount on a category basis at 435, such that the portion of the amount categorized as "defense" goes to the defense Accounts 1010 and 1010', and the portion of the amount categorized as "indemnity" goes to indemnity Accounts 1015 and 1015'. Therefore this arrangement simulates the logic of categorizing each allocated amount partly as defense and partly as indemnity, and tracking the amounts separately as required by the policy terms.

Also, because in this example both policies have an aggregate limit of $1,000,000 (805, 805'), the Framework Layer creates a representation of a Trigger within each policy, as shown in FIGS. 10A-10B at 1020 and 1020', where each Trigger threshold 222 will be set to $1,000,000. Each Trigger will have the Action objects shown at 1035 and 1035'. This is important because, for each Trigger, when the threshold condition is met, the Action steps (330) will be executed. The effect of the Action steps, in this case, will be to change the connectionvalues 204 of the Distributors represented at 1005 and at 1005' from [defense,indemnity] to [0,0]. In effect, because the values [0,0] will be treated as multiplicative weights at 430, this change "turns off" the flow of money into the Accounts represented at 1010, 1015, 1010', and 1015'. Once these weights are changed to [0,0], no further amounts will be passed to these Accounts. Therefore, this arrangement simulates the logic that once the aggregate limits of the policies are reached, the limits are considered exhausted, and no further coverage is available under the policies.

Also, because in this example the terms of Policy A specify that defense costs should be treated as inside limits (810), but the terms of Policy B specify that defense costs should be treated as outside limits (810'), the Framework Layer connects the Core Operators within these policies differently. The Framework Layer automatically creates a representation of two connections to the Trigger at 1020—one each from Accounts 1010 and 1015, but creates a representation of just one connection to the Trigger at 1020'—from the Account at 1015'. There is no connection from Account 1010' to Trigger 1020'. This is important because, in the calculations beginning at 710, only those Accounts which connect to a Trigger are included when determining the minimum total allocation amount that will fulfill that Trigger's threshold condition. Therefore, the threshold condition of the Trigger represented at 1020 is fulfilled when the sum of the storedamount 214 of the Accounts represented at 1010 and 1015 is $1,000,000. In contrast, the threshold condition of the Trigger represented at 1020' is fulfilled when only the storedamount of the Account represented at 1015', which represents indemnity, is $1,000,000. In this way, the arrangement simulates the logic of the two policies' different treatment of defense costs, where Policy A counts defense costs toward its limit, but Policy B does not.

In this example, after the Framework Layer converts the policy information into this visual representation, which is presented to the user graphically by the Design Layer (at 104), the Design Layer then transforms this visual representation into the Specification (at 108), which is the text representation used by the Allocation Engine. Next the Allocation Engine Steps are executed, which causes the monetary amounts to be allocated to the Accounts represented at 1010, 1015, 1010',1015' in accordance with the required logic of the allocation. These stored monetary amounts simulate how the losses from the table at 900 should be allocated under the terms of Policy A and Policy B using a pro rata allocation method. The states of these Account objects—specifically, the stored monetary amounts—represents the final allocation result.

As an example of how representing the internal logic of the insurance policies using the Core Operators represents an improvement over prior art, suppose a change to the allocation rules is needed. Suppose the terms of Policy A are interpreted to mean that the aggregate limit does not include defense costs. To implement this change within the Design Layer, the line which has been drawn from the Account representation at 1010 to the Trigger representation at 1020 would be deleted. After this deletion, the Specification is then created at 108 of the Main Steps, the defense Account (1010) will not be treated as connected to this Trigger, and the Allocation Engine Steps will correctly simulate the new treatment of defense costs. Note that making this change required only a single step by the user, and required no change to the underlying code. Although prior art can handle this situation, it does so by including exceptions and conditions within the code itself for policies in which the defense costs are considered included in the limit versus policies in which defense costs are not included. Here both situations are handled using the same three Core Operators—Distributor, Account, and Trigger—and only these three operators need to be defined in the code.

Note that in the above example, the same change could alternatively be made by editing the text of the Specification itself. Within the Specification, the user would delete the reference to the Trigger represented at 1020, within the connections property 203 enclosed by brackets that correspond to the Account represented at 1010.

In some situations, a user may choose to use only the Design Layer to create the Specification (such as in FIGS. 2D-2E). The interface presents the user with a graphical representation of a blank canvas. In response to user input, the Design Layer allows the user to add graphical representations of Distributor, Account, and Trigger objects, and draw connections between them. The user can also set parameters required for the Specification—for example the threshold property 222 of a Trigger. Once the user has completed this graphical design, the Design layer automatically transforms it into the Specification used by the Allocation Engine, and the Allocation Engine Steps are executed to perform the allocation.

Figure 11:
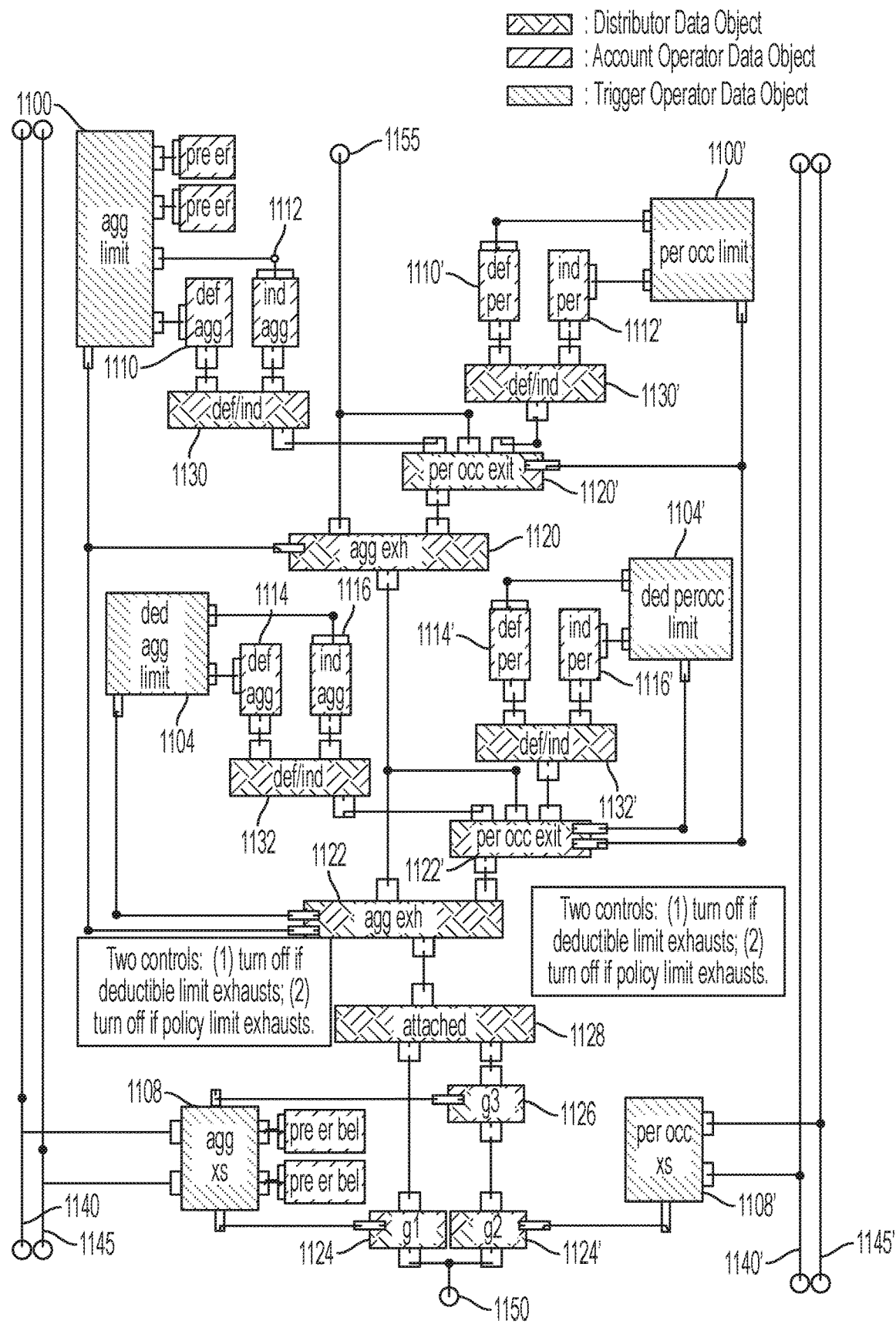
FIG. 11 is a visual representation of a policy with multiple limits, according to an example.

FIG. 11 shows an example implementation of insurance policy logic as represented in the Design Layer. Whereas previous examples were constructed for simplicity, this example illustrates a more complex policy logic. Here, numerous Core Operator objects are arranged to simulate the logic of the terms of a hypothetical insurance policy. These terms define rules that govern the conditions under which it is permissible to allocate money to the policy. In general, for the policy shown here, the rules are (1) that the policy is not attached until there is sufficient loss in the policy period (the policy's "attachment point", discussed below), (2) that after the policy is attached, deductible limits should be exhausted before coverage is provided, and (3) that after the policy is attached and the deductible limits are exhausted, coverage is provided only up to certain limits, which are the "policy limits".

The illustration in FIG. 11 introduces a new graphical element. Here, connections between objects are depicted using lines as before, but in some cases two lines "join" into one line, and in other cases a single line "splits" into two lines. For example, the line from Distributor 1120 to the external connection 1155 joins at the small black circle with the line from Distributor 1120' to external connection 1155. This indicates that both 1120 and 1120' have a connection to 1155, just as if the lines were completely separate. Similarly the external connection from 1150 splits at the small black circle into two lines that connect to 1124 and 1124'. This indicates that 1150 has connections both to 1124 and to 1124', just as if the two lines were completely separate.

Also, just as in the FIGS. 10A-10B example, this example implements separate tracking of defense and indemnity amounts, in order to simulate the logic of policy terms which may require that these amounts be treated differently. There are four Distributor objects (1130, 1130', 1132, 1132') and eight Account objects (1110, 1112, 1114, 1116, 1110', 1112', 1114', 1116') that implement this separate tracking and accounting of defense and indemnity. These Distributors have a connectionvalues property (204) that contains two labels ['defense', 'indemnity'] which correspond to each of the two connections of each Distributor. In effect, each connection from one of these Distributors to one of these Accounts carries either defense or indemnity amounts, and each Account tracks either the total of either defense (1110, 1114, 1110', 1114') or indemnity (1112, 1112', 1116, 1116') amounts, as determined by the corresponding connection and label.

In addition to implementing the logic of separate tracking of defense and indemnity, this more complex example demonstrates how the Core Operators can implement several other important insurance allocation concepts, including the "attachment point", "deductible", and "policy limit" concepts. The implementation of these concepts is described below, but first the distinction between "aggregate" and "per occurrence" amounts is explained further.

"Occurrence" is a term of art in the insurance industry which essentially means an "incident". Losses that derive from the same incident are said to belong to the same "occurrence." This is important because the amount of coverage available may be limited by whether the covered losses are deemed to arise from a single occurrence or from multiple occurrences. In particular, if a policy has a "per-occurrence" limit, that limit applies separately to each occurrence. For example, if a policy has a per-occurrence limit of $1,000,000, and there are three separate occurrences, then the policy provides a total coverage of $3,000,000, because $1,000,000 is available to cover each occurrence separately. By contrast, if a policy has an "aggregate" limit, that limit may apply to all occurrences in aggregate. For example, if a policy has an aggregate limit of $2,000,000, then the policy provides a total coverage of $2,000,000, even if there are three separate occurrences. Other kinds of policy limits are also common.

This logic becomes more complicated when the same policy has multiple limits. For example, a policy could have both a per-occurrence limit of $1,000,000 and an aggregate limit of $2,000,000, in which case both rules apply: (1) the policy will not pay more than $1,000,000 for any particular occurrence, and (2) the policy will not pay more than $2,000,000 in total across all occurrences. For this reason, when a policy is "exhausted", it could be exhausted either on a per-occurrence basis, which means the per-occurrence limit is exhausted for a particular occurrence, or on an aggregate basis, which means the aggregate limit is exhausted across all occurrences. However the logic of the per-occurrence and aggregate limit involves an interdependency; if the policy is exhausted on an aggregate basis, then it does not matter whether the policy is also exhausted on a per-occurrence basis; likewise, if the policy is exhausted on a per-occurrence basis, then it does not matter whether the policy is also exhausted on an aggregate basis.

Similarly, a policy could have a "per-occurrence deductible", which means the policyholder should pay a deductible on each occurrence before coverage is provided for that occurrence; or the policy could have an "aggregate deductible", which means the policyholder should pay one deductible that applies to occurrences in aggregate.

Similarly, a policy could have a per-occurrence or aggregate "attachment point", which means that sufficient loss should be allocated to the period either for a particular occurrence or in aggregate across some or all occurrences, respectively, before the obligations of the policy are triggered.

In some situations, it is determined that each claim by a harmed person should be considered a separate occurrence. This has important consequences for the allocation procedure. If a policy has a per-occurrence limit and each claim is a separate occurrence, then according to the rules of allocation, a separate limit is available to cover each claim. Stated differently, the per-occurrence limit should be "reset" after each claim is allocated, such that a full limit is available for the next claim. Nevertheless, if the policy also has an aggregate limit, then the total amount allocated to the policy across all applicable claims may not exceed this limit.

Figure 3:
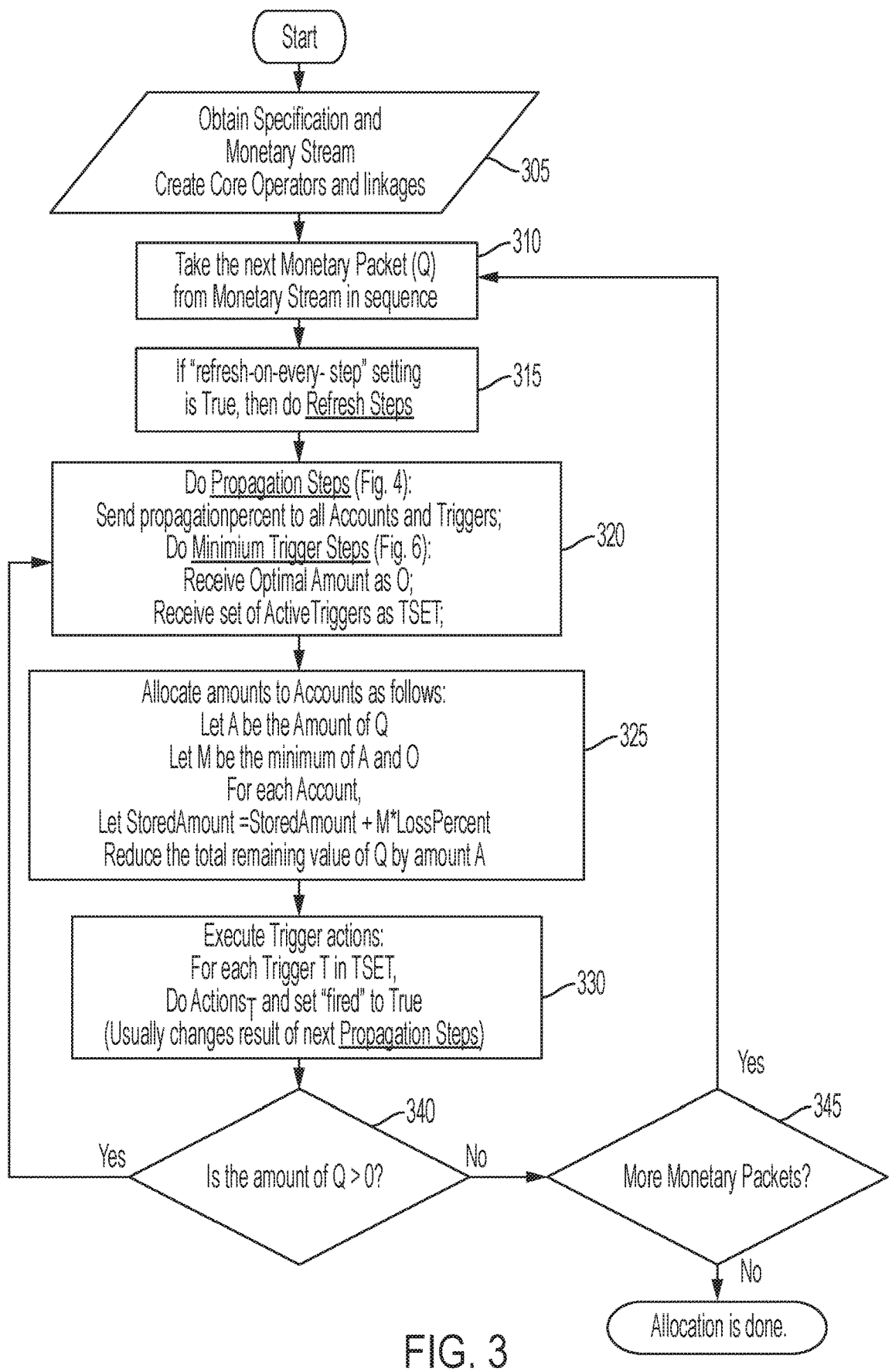
FIG. 3 is a flow chart of a process by an allocation engine, according to an example.

In the example of FIG. 11, the network is designed to simulate such an allocation rule. Specifically, when the Core Operator objects which represent the per-occurrence logic of the policy are created, the refreshable property (206,216, 228) is set to "True". For all other objects the refreshable property is set to "False". Also, the "refresh-on-every-step" setting is set to "True" (FIG. 3 at 315). In addition, the Monetary Stream (250) is defined such that each Monetary Packet (260) represents a separate claim. During the simulation, after each Monetary Packet (Q) is drawn from the Monetary Stream (FIG. 3 at 310), each operator object involved in the per-occurrence logic will therefore reset to its original state (at 315), whereas other objects—those involved in simulating the aggregate limit, for example—will not reset. This simulates the allocation rule that each claim should be treated as a separate occurrence, while also simulating the aggregate limit and other aspects of policy logic.

The implementation shown in FIG. 11 is able to simulate attachment points, deductibles, and policy limits, simultaneously, on both an aggregate basis and per-occurrence basis, as explained below. In this more complex example, four Account objects (1110, 1112,1110' and 1112') represent the final allocation to the policy; two Accounts represent the aggregate allocation to the policy (1110 and 1112), and two Accounts, which reset after each occurrence, represent the per-occurrence allocation to the policy (1110' and 1112'). The amounts stored in these Accounts represent the final allocation to this policy, either on an aggregate basis (1110 and 1112), or for the current occurrence (1110' and 1112').

The-attachment point logic is implemented by multiple objects (1108,1108',1124,1124',1126,1129). Suppose this policy has both an aggregate attachment point and a per-occurrence attachment point of $1,000,000. In that case, a way is needed to "detect" when $1,000,000 has been allocated to the period, either on an aggregate or per-occurrence basis. Here, Triggers 1108 and 1108' serve the purpose of detecting when $1,000,000 is allocated to the period. In this example, the threshold property (222) of both Triggers is set to $1,000,000. For purposes of this example, assume that other Account objects represent the total amount allocated to the policy period. Here only the connections (212) of these Accounts are shown (1140,1145,1140',1145'). Because of these connections, Triggers 1108 and 1108' monitor the total amount allocated to the period, and "detect" when that amount is exceeds $1,000,000 threshold required for attachment of this policy.

In order to separately simulate the aggregate and per-occurrence attachment points, Trigger 1108 and Trigger 1108' are connected differently. Trigger 1108 is connected to Account objects that represent the total amount allocated to all policies that cover the same policy period, as accumulated over all occurrences (1140,1145). Trigger 1108' is connected to Account objects that also represent the total amount allocated to all policies that cover the same period (1140',1145'), except these Accounts and Trigger 1108' are "refreshable" (216,228), which means that after each occurrence these objects are reset to their original state. Together, Triggers 1108 and 1108' detect when the total amount allocated to the same policy period on an aggregate or per-occurrence basis, respectively—exceeds the $1,000,000 threshold.

To complete simulation of the attachment point, the network may be designed such that amounts are prevented from propagating to the Accounts which represent the final policy allocation (1110, 1112,1110' and 1112') until Triggers 1108 and 1108' "detect" the conditions for attachment. The Distributor objects g1, g2 and g3 (1124,1124',1126) prevent or allow such propagation, depending on the state of the connectionvalues property (204) of each Distributor. Specifically, the connectionvalues properties of g1 (1124) and g2 (1124') are set initially to [0], which means the corresponding connections are "off" (in effect). Also, the connectionvalues property (204) of g3 (1126) is set initially to [1], which means the corresponding connection is "on" (in effect). In this initial state, monetary amounts entering the policy network via external connection 1150 are prevented from propagating beyond g1 and g2 (1124 and 1124'). This simulates the rule that amounts cannot be allocated to this policy until the conditions for attachment have been fulfilled.

Next, the network may be designed such that after the conditions for attachment are detected, amounts are permitted to propagate to the Accounts which represent the final policy allocation (1110, 1112, 1110' and 1112'). In this example, the Action objects of Triggers 1108 and 1108' are set to cause the required changes.

Specifically, to implement the aggregate attachment point, the Action object of Trigger 1108 is set to cause the connectionvalues (204) of g1 (1124) to change from [0.0] to [1.0], and the connectionvalues (204) of g3 (1126) to change from [1.0] to [0.0]. Thus Trigger 1108 "turns on" the connection of g1 and "turns off" the connection of g3. In effect, when Trigger 1108 detects that the conditions for attachment on an aggregate basis are fulfilled—and only then—amounts are permitted to propagate from g1 (1124) to Distributor 1128.

Likewise, to implement the per-occurrence attachment point, Trigger 1108' is set to cause the connectionvalues (204) of g2 (1124') to change from [0.0] to [1.0]. Thus Trigger 1108' "turns on" the connection of g2 (1124'). In effect, when Trigger 1108' detects that the conditions for attachment on a per-occurrence basis are fulfilled—and only then—amounts are permitted to propagate from g2 (1124') to Distributor 1128. However unlike the objects which simulate the aggregate attachment-point logic, for these objects (1108' and 1124') the refreshable property (206 and 228) is set to "True", which means these objects reset to their original state after each occurrence.

In this example, note that Trigger 1108 "turns off" g3 (1126) at the same time it "turns on" g1 (1124). This simultaneous change to the network simulates the logic that if the policy is attached simultaneously on an aggregate basis and a per-occurrence basis, amounts should not be double-counted; instead, amounts should propagate to final allocation Accounts (1110,1112, 1110' and 1112') only via g1, and not via g2.

To summarize, the "attachment point" logic is simulated as follows. The connections of g1 (1124) and g2 (1124') are initially "off". In this initial state, no monetary amounts received via the external connection (1150) can propagate beyond g1 and g2, which simulates the rule that allocation to the policy is prevented until the total amount allocated to the policy period exceeds the policy attachment point. When the amount exceeds the policy attachment point, either on an aggregate basis or per-occurrence basis (or both), Triggers 1108 and/or 1108' "turn on" g1 and/or g2. This allows amounts to propagate beyond g1 and/or g2 and (potentially) to the Accounts that represent the final allocation amount (1110, 1112, 1110' and 1112'). This simulates the rule that after the policy is attached, allocation to the policy is permitted.

The "deductible" logic is also simulated by multiple objects (1104, 1114, 1116, 1122, 1132, 1114, 1116, 1104', 1114', 1116', 1122', 1132'). Suppose the policy has an aggregate deductible of $500,000. In order to determine when the deductible has been satisfied, a way is needed to "detect" when $500,000 has been applied to the deductible. In this implementation, amounts applied to the deductible are represented by the deductible Accounts (1114, 1116, 1114', and 1116'). Here, Trigger 1104 serves the purpose of detecting when the sum of these amounts exceeds the deductible. The threshold property (222) of 1104 is set to $500,000. The connectionvalues property (204) of Distributor 1122 is set initially to [0.0, 1.0], which means, in effect, that its first connection (left side) is "off" and its second connection (right side) is "on". Also the connectionvalues property (204) of Distributor 1122' is set initially to [1.0, 0.0, 1.0], which means, in effect, that its first and third connections (left side and right side) are "on" and its second connection (middle) is "off". In this initial state, amounts from Distributor 1128 propagate to 1122, then to 1122', then to 1132, and then to Accounts 1114 and 1116. Accounts 1114 and 1116 track defense and indemnity amounts separately, because the connections from 1132 correspond to labels ['defense', 'indemnity']. As in previous examples, this arrangement means, in effect, that Trigger 1104 detects when the amounts stored in the deductible accounts exceeds $500,000, which simulates that the deductible is satisfied.

To complete implementation of the deductible logic, the network may be arranged such that after the deductible is satisfied, subsequent amounts do not count toward the deductible, but count instead toward policy limits. The Action object of 1104 is set to cause this change. The Action object of Trigger 1104 causes the connectionvalues (204) of Distributor 1122 to change from [0.0, 1.0] to [1.0, 0.0]. In this way, Trigger 1104 "turns on" the first connection of Distributor 1122 and "turns off" the second connection. This arrangement means that, in effect, amounts propagate to the Accounts 1114 and 1116 before Trigger 1104 "detects" that the deductible is satisfied, but propagate instead to Distributor 1120 afterward.

In summary, the implementation of FIG. 11 is able to simulate the "aggregate deductible" logic as follows. Initially, monetary amounts received at 1122 after attachment propagates via Distributors 1122' and 1132 to the deductible Accounts 1114 and 1116. This simulates the rule that amounts should count toward the deductible before the deductible is satisfied. When Trigger 1104 detects that the total amount in Accounts 1114 and 1116 exceeds the deductible amount, a Trigger action causes the network to changes such that thereafter amounts received at 1122 propagate to Distributor 1120 instead of to the deductible Accounts 1114 and 1116. This simulates that the deductible is satisfied.

Note that a per-occurrence deductible is also implemented here, in almost the same way as the aggregate deductible, but using 1104',1114',1116'. 1122', and 1132', which have a refreshable property (206,216,228) set to "True". Here the Accounts 1114' and 1116', which track only those amounts that correspond to the current occurrence, are monitored by Trigger 1104'. The action of Trigger 1104' is set to change the connectionvalues (204) property of Distributor 1122' from initial values [1.0, 0.0, 1.0] to [0.0, 1.0, 0.0]. In this way Trigger 1104' detects exhaustion of the per-occurrence deductible and causes amounts to propagate to Distributor 1120 instead of Accounts 1114' and 1116'.

The "policy limit" logic is implemented by multiple objects in a similar manner (1120,1120',1130,1130',1110, 1110',1112,1112',1100,1100'). Accounts 1110 and 1112 track the aggregate amount allocated to the policy after satisfaction of the deductible via connections from Distributors 1120,1120' and 1130; Trigger 1100 detects when the aggregate amount exceeds the aggregate limit; the action of the Trigger causes amounts to propagate thereafter to an external connection 1155 instead of to these Accounts. Likewise Accounts 1110' and 1112' track the per-occurrence amount allocated to the policy after satisfaction of the deductible; Trigger 1100' detects when the per-occurrence amount exceeds the per-occurrence limit; the action of the Trigger causes amounts to propagate thereafter to the external connection 1155 instead of to the Accounts 1110' and 1112'. As above, the objects which simulate the per-occurrence logic have a refreshable property (206,216,228) set to "True".

The interdependency of the per-occurrence and aggregate limit is simulated by the arrangement of 1120 and 1120'. If Trigger 1100 detects that the aggregate limit is exhausted, amounts propagate thereafter via 1120 to the external connection (1155) regardless of whether the per occurrence limit is also exhausted. Likewise, if Trigger 1100' detects that the per-occurrence limit is exhausted, amounts propagate thereafter to the external connection (1155) even if the aggregate limit is not exhausted.

Note that Triggers 1100 and 1100', which simulate detection of the exhaustion of policy limits, also have connections to Distributor 1122 and 1122', respectively, which are involved in implementing deductible logic. The reason for these connections is that according to the terms of the policy, when the policy exhausts, either on an aggregate or per-occurrence basis, the corresponding deductible no longer applies. Therefore Triggers 1100 and 1100' also have actions that "turn off" the connections to the deductible Accounts (1114.1116. 115', 1116'), in addition to the actions that "turn off" connections to the policy limit Accounts (1110, 1112, 1110', 1112'). This ensures that at the end of the simulation, the amounts stored in the deductible Accounts represent only amounts that count toward the deductible, even if the policy limits became exhausted before a deductible was satisfied.

An important feature of the Design Layer is its ability to represent a "subsystem". A subsystem is represented graphically as an icon that can be manipulated on the canvas, much like the other Core Operators. When the subsystem icon is opened (such as by double-clicking with a mouse), it opens into its own separate canvas. Just like the canvas initially presented by the Design Layer, a subsystem canvas can itself contain representations of the Core Operators or other subsystems. In this way, the Design Layer supports deeply hierarchical representations. This hierarchical capability is important because it permits the expert to design high-level constructs—such as policies, towers, and layers, in the case of insurance allocation—by constructing them out of more primitive constructs, which are in turn constructed from only the three Core Operators. This enables the user to think in terms of familiar constructs while exposing the detailed logic of these constructs to manipulation. Since the Design Layer includes copy and paste operations, the user can design one construct by hand, place its representation into a subsystem, and make numerous copies of that subsystem. In this way, the subsystem can serve as a template for creating multiple copies of the representation of a policy (or other object or concept that corresponds to a monetary category), or copies of just certain logical components. The user can then link these subsystems together with connections according to the logic required for the current allocation problem. Then the Design Layer automatically creates a Specification, and the Allocation Engine performs the allocation.

The Surgery Layer is used when a large number of changes need to be made to many similar elements. For example, it is possible to "tag" a Core Operator or a subsystem representation in the Design Layer using a keyword. If the Core Operator is then copied that tag will be copied as well. Later, if the user had reason to delete all copies of the tagged core operator, the Surgery Layer has this capability. In the case of insurance allocation, the Surgery Layer has the capability, for example, to make changes within each policy subsystem tagged by a particular key-word from one type of policy to another. For example, by deleting the Account which tracks defense costs in all such subsystems, the policies would be converted from policies that do cover defense costs to policies that do not cover defense costs.

Often the user will use the Framework Layer as a first step in a complex allocation, and then customize the result using the Design Layer. As explained in the example depicted in FIGS. 8, 9, and 10, the Framework Layer automatically transforms policy information, or information about other financial instruments, or other concepts or objects that correspond to categories of monetary amounts, into a graphical representation of the Core Operators used by the Design Layer, arranging them in such a way that together they simulate the logic of the required allocation. Typically it embeds the logic associated with a particular financial instrument within a subsystem. If there are multiple instruments, there will be multiple subsystems. In certain situations the Framework Layer will create other instances of the Core Operators to manage certain aspects of the allocation.

Figure 12:
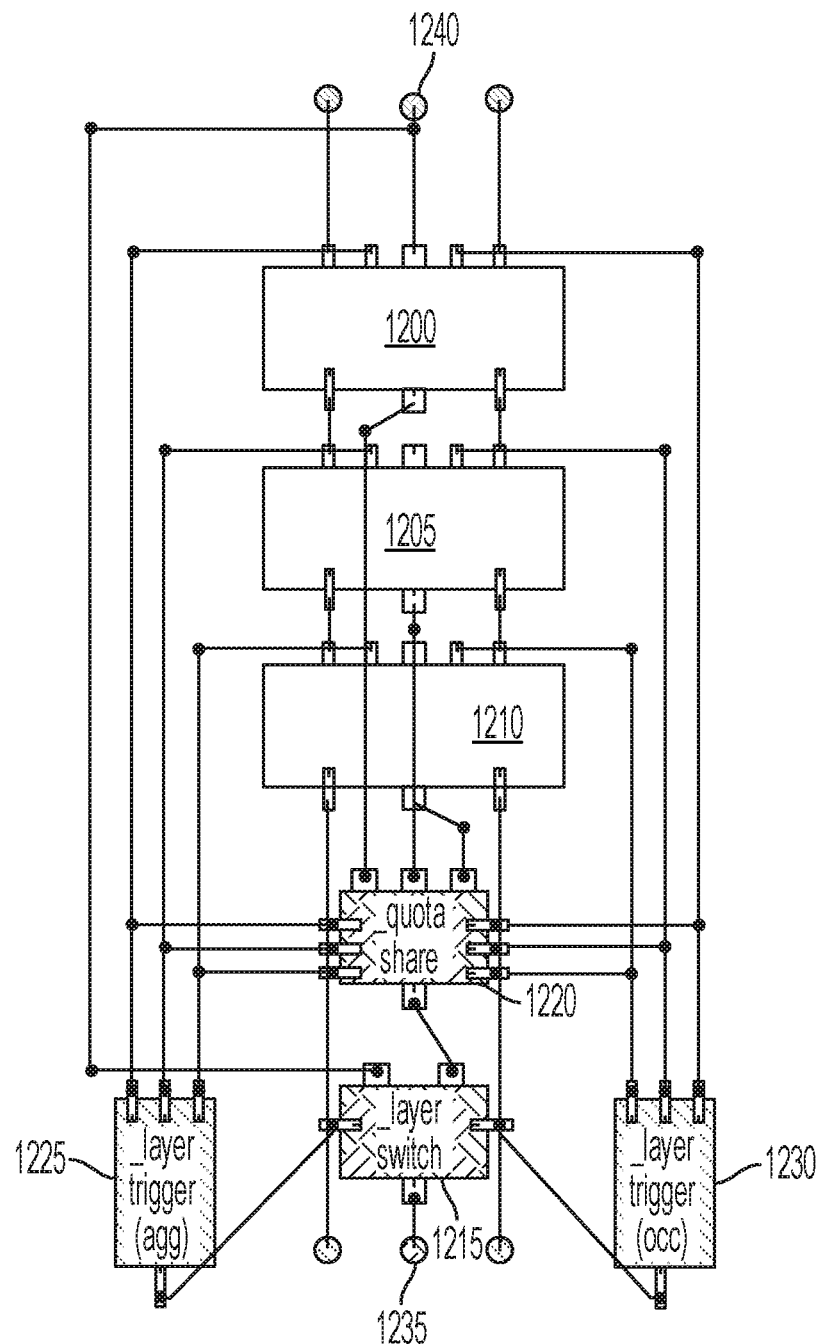
FIG. 12 is a visual representation of a quota-share layer, according to an example.

FIG. 12 shows an example implementation of the logic of a "quota-share layer" created this way. It represents the logic of three insurance policies, where the policy-specific details of each policy are embedded within a subsystem (1200, 1205, and 1210). It includes additional Core Operators that simulate the specific logic of the quota-share layer. These additional components manage the distribution of amounts within the layer and provide for reallocation within the layer if one or more policies exhaust before the others (1215, 1220,1225,1230). In the insurance industry, the concept of a quota-share layer is that the policies within the layer may simultaneously share all losses that reach the layer, almost as if the layer were itself a single policy. Here the quota-share layer representation is itself embedded in a subsystem, with connections in and out of the quota-share layer represented by small circles such as at 1235. The logic simulated here is complex, but the components are as follows. Distributor 1215 ("layer switch") allows monetary amounts that enter the layer at 1235 to propagate either to Distributor 1220, or to an external connection (1240), depending on whether all policies within the quoashare layer are exhausted. Distributor 1220 ("quotashare") splits each amount into shares, and these amounts propagate to the policy subsystems, according to weights defined by the connectionvalues property (222), where the weights sum to 1. Triggers hidden within the policy subsystems detect the exhaustion of policy limits, as in previous examples. Connections from these hidden Triggers within each policy subsystem go to Distributor 1220 ("quotashare") and to Triggers 1225 and 1230. Each hidden Trigger has two actions related to Distributor 1220: the first action sets the weight which corresponds to the connection to the same policy subsystem to a value of 0, which effectively "turns off" this connection. The second action causes the weights of Distributor 1220 to renormalize such that the weights again sum to 1. In effect, when a policy exhausts, these actions "turn off" the connection to the subsystem of the exhausted policy and redistribute that policy's share to the unexhausted policies.

In addition, the hidden Triggers connect to Triggers 1225 and 1230. When these Triggers detect that all three hidden Triggers have "fired", indicating that all three policies are exhausted, the actions of 1225 and/or 1230 change the connectionvalues property of (222) from [0,1], to [1,0]. These actions "turn off" the connection to Distributor 1220, and "turn on" the external connection (1240).

Figure 13:
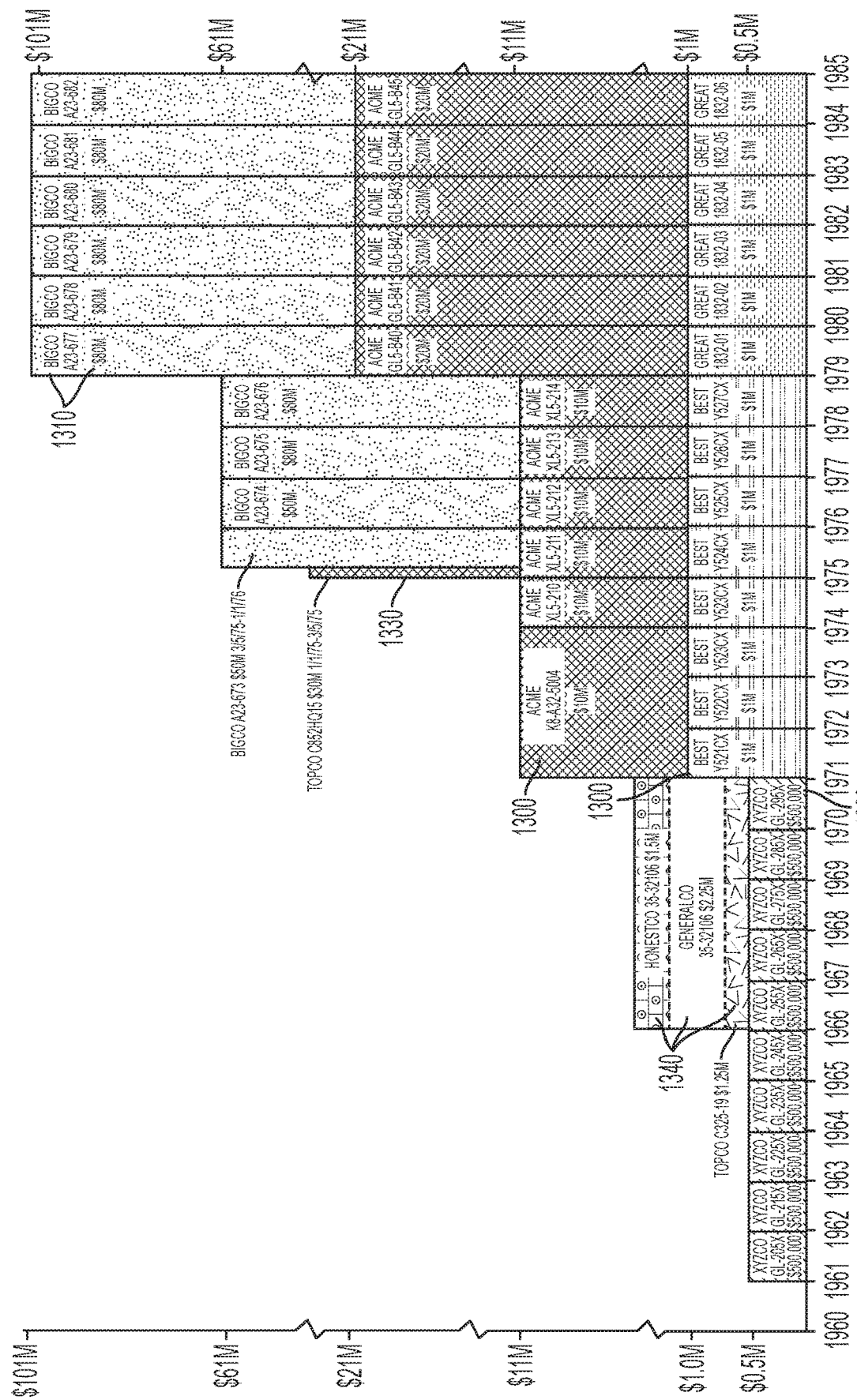
FIG. 13 is a hypothetical insurance chart for a company, according to an example.

The potential complexity of insurance allocation problems becomes more apparent when there are more than just a few policies to consider. Real-world insurance problems typically involve dozens, hundreds, or thousands of insurance policies, where each policy has the possibility of distinct policy terms. The industry-standard way of illustrating a large portfolio of insurance policies issued to a policyholder over time is called an "insurance chart". FIG. 13 contains an example of an insurance chart for a hypothetical policyholder, "ABC Inc." which has fifty insurance policies. Each insurance policy is represented as a single rectangle positioned on horizontal and vertical axes (for example at 1300). The y-position of the bottom edge of each rectangle indicates the policy attachment point; the horizontal extent indicates the start and end dates of the policy period, in correspondence with x-axis tick marks; and the height of the rectangle indicates the policy limit, in correspondence with y-axis tick marks. In addition, each policy is typically labeled with key information such as the insurance company name, the policy number, and the policy limit (for example at 1310).

Allocating multiple liabilities to a diverse portfolio of policies such as this is complex. Here, company ABC Inc. may have received hundreds of thousands of claims, where each claim potentially triggers a different range of policy periods. The example also illustrates the "layer" concept. Here, there is a "primary" layer of insurance that includes twenty-four individual policies between 1961 and 1985. Before 1971 the policies have a limit of $500,000, but after 1971 the policies have a limit of $1M (at 1320). A second "umbrella" layer of insurance includes policies between 1966 and 1985, which attach at $500,000 (policies at 1340), or at $1M (beginning with policy at 1300), after one or more underlying primary-layer policies become exhausted. A third "excess" layer of insurance includes policies between 1975 and 1985, beginning with the policy at 1300. Policies in this excess layer will not become attached until one or more underlying primary-layer policies and umbrella policies covering the same period become exhausted.

The example also illustrates some irregularities that can increase the complexity of such allocation problems. The umbrella policy represented at 1300 is a three-year policy, which means—depending on interpretation of policy language—that a single policy limit (here $10M) is available for the entire three-year period of the policy. This also means, according to the procedure explained in the Pro Rata Split Steps (FIG. 6), that the limit of this policy will be consumed at approximately three times the rate of an equivalently-situated one-year policy, due to the increased time-on-risk. The excess policy represented at 1330 is a "stub" policy, which means it has a term of two months and five days. This also means, according to the same procedure, that the limit of this policy will be consumed at approximately ⅙ of the rate of an equivalently-situated one-year policy. The three policies represented at 1340 form a quotashare layer, which means that under the terms of each policy, coverage is provided for a specified share of loss allocated to the five-year policy period. In fact, the example of FIG. 12 is one way to implement the logic required for the quotashare layer shown here at 1340. As depicted here, "Honestco" covers a 30% share up to $1.5M, "Generalco" covers a 45% share up to $2.25M, and "Topco" covers a 25% share up to $1.25M. The quota-share layer provides $5M of coverage in total, excess of the underlying primary insurance.

Note that these complicating aspects of this hypothetical insurance portfolio can be handled by logical combinations of the three core operators. While the examples may refer to 'all,' the embodiments are not limited as such and some portion of all may be implemented. In the example, the split of each loss among policy periods between years 1960 and 1985 can be handled by a Distributor object, during the Pro Rata Split steps (FIG. 6). The split of shares within the quota-share layer at 1340 can be handled by a Distributor object, with connectionvalues (204) assigned as weights that reflect each policy's share. Trigger actions can adjust these shares as needed whenever a policy's limit exhausts, as shown in FIG. 12. For each policy, the logic of the policy limit itself can be implemented using a combination of Triggers, Distributors, and Accounts, as detailed in FIG. 11. After exhaustion of a policy limit, subsequent monetary amounts can be diverted (in effect) to the next layer above, such as via 1150 or 1155 in the example of FIG. 11.

Note also that while the example of FIG. 13 does not depict any policies issued before 1960 or after 1985, this fact should not be construed to imply that the invention is only useful for allocation problems involving a specific time period. The invention is suited for allocation of any losses or monetary amounts and for any insurance policies, financial instruments or monetary categories—historical, present or future, including possibly for underwriting purposes—as long as the logic of the allocation problem corresponds to the deep logic that the Core Operator objects are to represent.

Another aspect not previously described is that additional values of the type property 232 of Action objects are defined, other than "setconnection". The "exec" Action type allows a value property 238 that is a reference to arbitrary user code. When this action is executed, the arbitrary user code is executed. This allows a user to specify that some change should be made to the Core Operators or other aspects of the allocation at a specific time during the allocation. This can be any arbitrary change that the user can write code to execute. Since the "exec" action is performed by a Trigger, the arbitrary change can be made to occur at any point during the allocation that can be defined using a Trigger's threshold condition. Another Action type is the "toggle" Action type. This allows the value property 238 to switch between two values in alternation each time the Trigger threshold condition is met, or more generally, to increment to the next value among a set of values each time the Trigger threshold condition is met. Another Action type is the "stoprefresh" Action type. This sets a flag which indicates that a particular member of the connectionvalues property 204 of a Distributor (specified by the target1 234 and target2 236 properties), should thereafter remain unchanged even if the "refreshable" property of the Distributor is "True". Another Action type is "normalize". This causes the Distributor specified by target1 234 to change numeric connectionvalues 204 such that the sum of the values is 1, while keeping the values in the same proportions to each other.

Another aspect not previous described is that a Trigger can also have connections to one or more other Trigger objects. In that case, target1 (234) of an Action object referenced by the actions property (224) will contain a reference to a Trigger object instead of to a Distributor object. The threshold condition of that referenced Trigger (as described in detail in the Minimum Trigger Steps), is in that case paired with a further condition that each Trigger it receives a connection from must also have met its threshold condition in order for the receiving Trigger to "fire"—i.e., to be included in the set of ActiveTriggers (FIG. 7 at 735) and execute its actions.

Another aspect not previously described is that an Account can have a "subaccounts" property, which is a collection of references to other Account objects. Whenever the storedamount 214 is accessed, the storedamount of these additional Account objects is added to the amount reported. Likewise whenever the propagationpercent 218 is accessed, the propagationpercent of these additional Account objects is added to the amount reported.

Note that at steps 430-445, when the value SendPercent$_T$ is passed to target T, either a reference to the original Monetary Packet or a modified copy may also be passed. This information is passed because the target T, or a subsequent target reached through successive connections, may need this information to determine how the propagation percent should propagate to the next target.

The computer system may more efficiently replicate the conceptual layer capabilities of current software tools for defense treatments, occurrence definitions, irregular time-on-risk ("stub") policies, exclusions, annualization, reallocation. And the computer system may add capabilities that the current software tools do not have, such as annualize aggregate limits but not per occurrence limits, noncumulation, multiple insureds for some but not other policies, pro rata split within a shared layer, arbitrary reallocation of certain claims by certain policies, dynamic reporting, dynamic reconfiguration, individualized policy language and legal situations.

Figure 14:
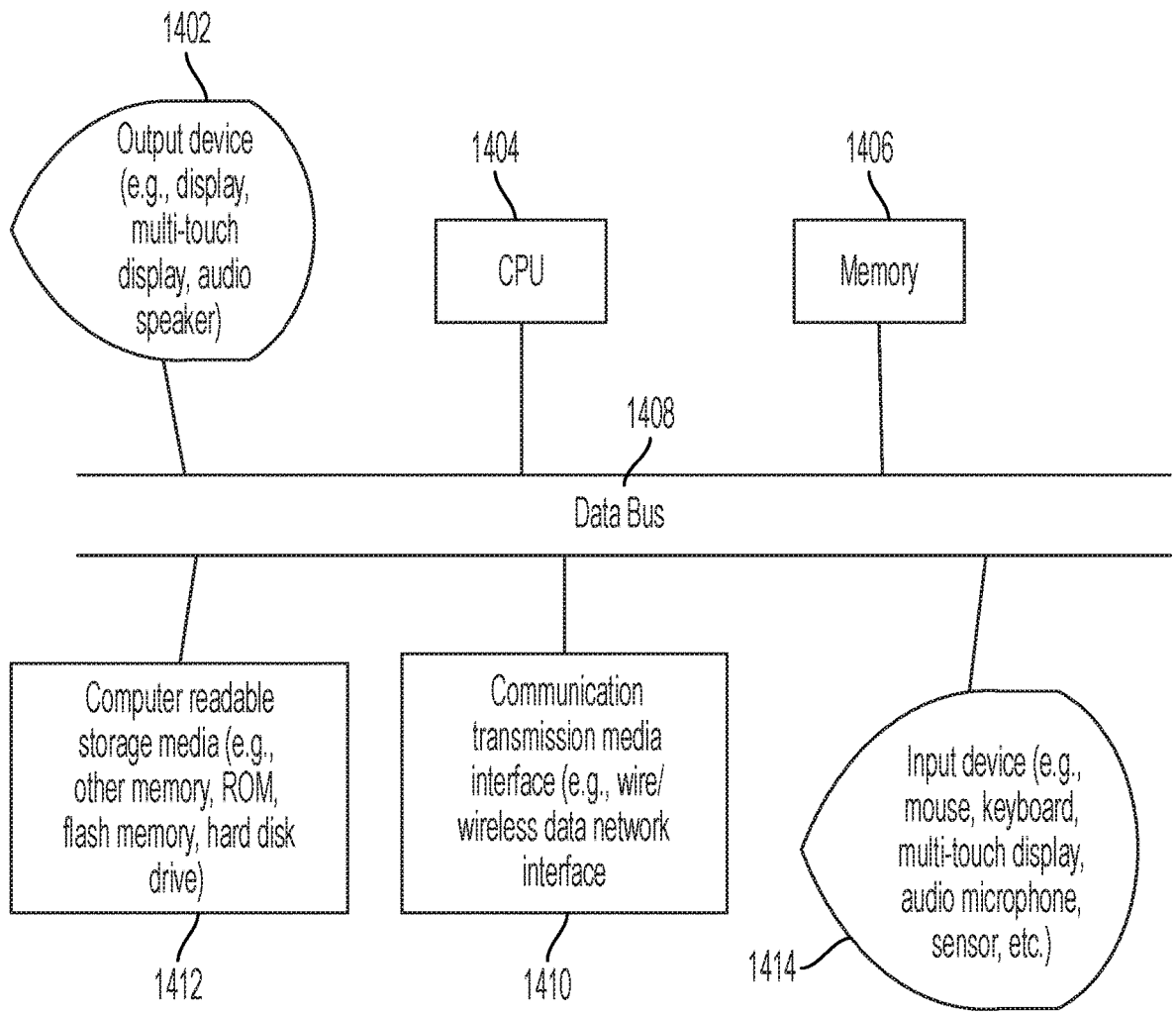
FIG. 14 is a functional block diagram of a computer, which is a machine, for implementing embodiments of the present invention.

According to an aspect of the embodiments of the invention, any combinations of one or more of the described features, functions, operations, and/or benefits can be provided. The word (prefix or suffix article) "a" refers to one or more. A combination can be any one of or a plurality. The embodiments can be a method and/or implemented as an apparatus (a machine) that includes processing hardware configured, for example, by way of software executed by the processing hardware and/or by hardware logic circuitry, to perform the described features, functions, operations, and/or benefits. A computing apparatus, such as (in a non-limiting example) any computer or computer processor that includes processing hardware and can store, receive, retrieve, process and/or output data and/or communicate (network) with other computing apparatuses. According to an aspect of an embodiment, the described features, functions, operations, and/or benefits can be implemented by and/or use processing hardware and/or software executed by processing hardware. For example, a computing apparatus as illustrated in FIG. 14 can comprise a central processing unit (CPU) or computing processing system 1404 (e.g., one or more processing devices (e.g., chipset(s), including memory, etc.) that processes or executes instructions, namely software/program, stored in the memory 1406 and/or computer readable media 1412, transmission communication interface (network interface) 1410, input device 1414, and/or an output device 1402, for example, a display device, a printing device, and which are coupled (directly or indirectly) to each other, for example, can be in communication among each other through one or more data communication buses 1408.

In addition, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An apparatus, comprising:
a memory, and
a processor coupled to the memory and configured to,
obtain information indicating plural rules, a rule among the rules to specify a plurality of conditions including at least one first monetary threshold condition and at least one second condition to correspond to the at least one first monetary threshold condition, the at least one second condition including a parameter or a combination of parameters in a set of parameters;
obtain information about a sequence of monetary amounts;
transform the rules into operator data objects in the memory that define a logic common to the rules to control allocation of the sequence of monetary amounts to at least one category,
the operator data objects forming a network of operator data objects, and
an operator data object, among the operator data objects, including operator data object types of,
a distributor data object including,
information indicative of a combination of the sequence of monetary amounts into one category among the at least one category, or split of the sequence of monetary amounts between plural categories among the at least one category, using the at least one second condition based on the parameter or the combination of parameters in the set of parameters to control the combination or split of the sequence of monetary amounts among connections in the network of operator data objects,
an account data object to store a monetary amount based upon the sequence of monetary amounts, corresponding to the combined one category or the split plural categories, and
a trigger data object including information forming an action data object to perform an action to control a change to a parameter or a combination of parameters in the set of parameters in response to the at least one first monetary threshold condition satisfied based on a monetary amount from the sequence of monetary amounts to be stored in the account data object;
perform a simulation, using the network of operator data objects, of allocation of the sequence of monetary amounts to the account data object by,
passing, in sequence, the information about the monetary amounts among the network of operator data objects, and
iteratively,
distributing the sequence of monetary amounts from the distributor data object to the account data object in the network of operator data objects, and
accumulating, in the account data object, at the monetary amount, among the sequence of monetary amounts, according to the at least one category by an action of the action data object of the trigger data object changing the parameter or the combination of parameters in the set of parameters in response to the at least one first monetary threshold condition satisfied based on the monetary amount stored in the account data object; and
indicate a result of allocation of the sequence of monetary amounts to the account data object according to the plural rules, based on the simulation.

2. The apparatus according to claim 1, wherein to store a monetary amount based upon the sequence of monetary amounts by the account data object includes storing at least a portion of at least one of the monetary amounts among the sequence of monetary amounts.

3. The apparatus according to claim 1, wherein
the parameters in the set of parameters include a weight, a label, and/or a date range; and
the action of the action object is any one or a combination of,
an action to change the weight, the label, and/or the date range parameter in the set of parameters;
an action to reset values of a parameter or a combination of parameters in the parameter set to values of an initial state; or
an action to normalize values of a parameter or a combination of the parameters in the parameter set.

4. The apparatus according to claim 1, wherein, in a case of plural trigger data objects connected to each other, the at least one first monetary threshold condition includes a plurality of first monetary threshold conditions and the plural trigger data objects include at least one action object which specifies an action in response to respectively satisfying the plurality of first monetary threshold conditions, the action including changing a parameter or a combination of parameters in the set of parameters.

5. The apparatus according to claim 1, wherein to execute the process to transform the rules, the processor is to,
generate a user interface to support construction of the operator data objects and connections among the operator data objects to define the logic common to the rules and form the network of operator data objects to pass the information on the sequence of monetary amounts and/or control information among the operator data objects to execute simulation of the allocation of the sequence of monetary amounts.

6. The apparatus according to claim 1, wherein at least one rule among the rules represents logic to allocate the sequence of monetary amounts to the at least one category for any one or combinations of insurance policy, money account, or a financial instrument.

7. An apparatus, comprising:
a memory to store a network of operator data objects corresponding to a transformation of rules into operator data objects that define a logic common to plural rules to control allocation of a sequence of monetary amounts to at least one category, a rule among the rules to specify a plurality of conditions including at least one first monetary threshold condition and at least one second condition to correspond to the at least one first monetary threshold condition, the at least one second condition including a parameter or a combination of parameters in a set of parameters; and
a processor coupled to the memory to implement an allocation engine to,
obtain information about the sequence of monetary amounts;
obtain, from the memory, the operator data objects and form a network of operator data objects, where an operator data object, among the operator data objects, including operator data object types of,
a distributor data object including,
information indicative of a combination of the sequence of monetary amounts into one category among the at least one category, or split of the sequence of monetary amounts between plural categories among the at least one category, using the at least one second condition based on the parameter or the combination of parameters in the set of parameters to control the combination or split of the sequence of monetary amounts among connections in the network of operator data objects,
an account data object to store a monetary amount based upon the sequence of monetary amounts, corresponding to the combined one category or the split plural categories, and
a trigger data object including information forming an action data object to perform an action to control a change to a parameter or a combination of parameters in the set of parameters in response to satisfying the at least one first monetary threshold condition based on a monetary amount from the sequence of monetary amounts to be stored in the account data object;
perform a simulation, using the network of operator data objects, of allocation of the sequence of monetary amounts to the account data object by,
passing, in sequence, the information about the monetary amounts among the network of operator data objects, and
iteratively,
distributing the sequence of monetary amounts from the distributor data object to the account data object in the network of operator data object, and
accumulating, in the account data object, the monetary amount, among the sequence of monetary amounts, according to the at least one category by an action of the action data object of the trigger data object changing the parameter or the combination of parameters in the set of parameters in response to the at least one first monetary threshold condition satisfied based on the monetary amount stored in the account data object; and
indicate a result of allocation of the sequence of monetary amounts to the account data object according to the plural rules, based on the simulation.

8. The apparatus according to claim 7, wherein to store a monetary amount based upon the sequence of monetary amounts by the account data object includes storing at least a portion of at least one of the monetary amounts among the sequence of monetary amounts.

9. The apparatus according to claim 7, wherein the parameters in the set of parameters include a weight, a label, and/or a date range; and
the action of the action object is any one or a combination of,
an action to change the weight, the label, and/or the date range parameter in the set of parameters;
an action to reset values of a parameter or a combination of parameters in the parameter set to values of an initial state; or
an action to normalize values of a parameter or a combination of the parameters in the parameter set.

10. The apparatus according to claim 7, wherein, in a case of plural trigger data objects connected to each other, the at least one first monetary threshold condition includes a plurality of first monetary threshold conditions and the plural trigger data objects include at least one action object which specifies an action in response to respectively satisfying the plurality of first monetary threshold conditions, the action including changing a parameter or a combination of parameters in the set of parameters.

11. The apparatus according to claim 7, wherein to execute the process to transform the rules, the processor is to,
generate a user interface to support construction of the operator data objects and connections among the operator data objects to define the logic common to the rules and form the network of operator data objects to pass the information on the sequence of monetary amounts and/or control information among the operator data objects to execute simulation of the allocation of the sequence of monetary amounts.

12. The apparatus according to claim 7, wherein at least one rule among the rules represents logic to allocate the sequence of monetary amounts to the at least one category for any one or combinations of insurance policy, money account, or a financial instrument.

* * * * *

UNITED STATES PATENT AND TRADEMARK OFFICE
CERTIFICATE OF CORRECTION

PATENT NO. : 11,127,079 B2
APPLICATION NO. : 16/505272
DATED : September 21, 2021
INVENTOR(S) : Michael Arthur Brown It is certified that error appears in the above-identified patent and that said Letters Patent is hereby corrected as shown below:

In the Claims

Column 32, Line 16:
Claim 1, after "object," delete "at".

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*